(12) United States Patent
Endtner et al.

(10) Patent No.: US 12,448,497 B2
(45) Date of Patent: Oct. 21, 2025

(54) HIGH VOLTAGE COMPONENTS

(71) Applicant: LANXESS Performance Materials GmbH, Cologne (DE)

(72) Inventors: Jochen Endtner, Cologne (DE); Dirk Schmitz, Weeze (DE); Matthias Bienmueller, Krefeld (DE)

(73) Assignee: Envalior Deutschland GmbH, Dusseldorf (DE)

( * ) Notice: Subject to any disclaimer, the term of this patent is extended or adjusted under 35 U.S.C. 154(b) by 531 days.

(21) Appl. No.: 17/439,627

(22) PCT Filed: Mar. 12, 2020

(86) PCT No.: PCT/EP2020/056700
§ 371 (c)(1),
(2) Date: Sep. 15, 2021

(87) PCT Pub. No.: WO2020/187702
PCT Pub. Date: Sep. 24, 2020

(65) Prior Publication Data
US 2022/0153962 A1 May 19, 2022

(30) Foreign Application Priority Data
Mar. 15, 2019 (EP) ..................... 19163035

(51) Int. Cl.
*C08K 5/3465* (2006.01)
*B29B 9/06* (2006.01)
*B29K 77/00* (2006.01)
*B29K 105/00* (2006.01)

(52) U.S. Cl.
CPC ............ *C08K 5/3465* (2013.01); *B29B 9/06* (2013.01); *B29K 2077/00* (2013.01); *B29K 2105/0026* (2013.01); *B29K 2105/0044* (2013.01); *B29K 2995/0017* (2013.01)

(58) Field of Classification Search
CPC ......... C08L 77/00; C08L 77/06; H01B 3/305; H01B 7/0045
See application file for complete search history.

(56) References Cited

U.S. PATENT DOCUMENTS

| | | |
|---|---|---|
| 3,644,574 A | 2/1972 | Jackson, Jr. et al. |
| 4,097,446 A | 6/1978 | Abolins et al. |
| 4,452,720 A | 6/1984 | Harada et al. |
| 4,806,593 A | 2/1989 | Kress et al. |
| 4,812,515 A | 3/1989 | Kress et al. |
| 4,859,740 A | 8/1989 | Damrath et al. |
| 4,861,831 A | 8/1989 | Damrath et al. |
| 5,955,614 A | 9/1999 | Kalz et al. |
| 6,855,755 B1 * | 2/2005 | Morimoto ............ C08K 5/3475 524/451 |
| 7,922,859 B2 | 4/2011 | Rosenberger |
| 9,050,843 B2 | 6/2015 | Duijnhoven Van |
| 9,481,831 B2 | 11/2016 | Bauer et al. |
| 2003/0065074 A1 | 4/2003 | Koshida et al. |
| 2006/0281846 A1 | 12/2006 | Hager et al. |
| 2012/0178855 A1 | 7/2012 | Correa et al. |
| 2015/0368459 A1 | 12/2015 | Yamanaka et al. |
| 2016/0053081 A1 | 2/2016 | Harada et al. |

FOREIGN PATENT DOCUMENTS

| | | | |
|---|---|---|---|
| CA | 2558151 | 8/2006 | |
| DE | 4 236 122 A1 | 4/1994 | |
| DE | 19543890 A1 * | 5/1997 | ............ C08G 69/48 |
| DE | 19814298 A1 | 10/1999 | |
| JP | 2009140612 A * | 6/2009 | |
| JP | 4536229 B2 | 9/2010 | |
| JP | 2014028889 A * | 2/2014 | |
| KR | 10-2006-0127244 | 12/2006 | |

OTHER PUBLICATIONS

Sykes (Aspects of Organic-colorant Selection for Engineering Polymers in the Automotive Industry, Plastics Compounding, 10(2), 1987, pp. 13-16, 18, 20-22).*
Machine translation of JP-2014028889-A (2014, 8 pages).*
Machine translation of DE-19543890-A1 (1997, 6 pages).*
Machine translation of JP-2009140612-A (2009, 9 pages).*
European Search Report from corresponding European Application No. 19163035, dated Sep. 12, 2019, two pages.
HEV America Technical Specifications dated Nov. 1, 2004, obtained from the Internet on Sep. 14, 2021 at www.//avt.inl.gov/sites/default/files/pdf/hev/hevtechspecr1.pdf.
Notice of Preliminary Rejection, KR Appln. No. 2021-7032679 (EN Translation), May 8, 2025.

* cited by examiner

*Primary Examiner* — Brieann R Johnston
(74) *Attorney, Agent, or Firm* — Nixon & Vanderhye, P.C.

(57) ABSTRACT

The present invention relates to high-voltage components, in particular for electromobility, containing polymer compositions based on at least one polyamide and 10,10'-oxybis-12H-phthaloperin-12-one, and to the use of 10,10'-oxybis-12H-phthaloperin-12-one for marking polyamide-based articles of manufacture as high-voltage components.

19 Claims, No Drawings

HIGH VOLTAGE COMPONENTS

The present invention relates to high-voltage components, especially for electromobility, comprising polymer compositions based on at least one polyamide and 10,10'-oxybis-12H-phthaloperin-12-one, and to the use of 10,10'-oxybis-12H-phthaloperin-12-one for the production of polyamide-based products, with the proviso of a color distance ΔE<20 from the L*a*b* coordinates of a color number beginning with "2" in the RAL color chart, and finally to the use of 10,10'-oxybis-12H-phthaloperin-12-one for marking of polyamide-based products as high-voltage components.

PRIOR ART

Technical thermoplastics such as polyamides are important materials, particularly also in the field of components for motor vehicles, due to their good mechanical stability, their chemical resistance, very good electrical properties and good workability.

Polyamides have formed an important constituent for manufacturing demanding motor vehicle components for many years. While the internal combustion engine has been the dominant drive concept for many years, new demands with regard to choice of materials are also arising in the course of the search for alternative drive concepts. A significant role is played here by electromobility, where the internal combustion engine has been replaced partly (hybrid vehicle [HEV, PHEV, BEV Rex]) or completely (electromobile [BEV, FCEV]) by one or more electric motors which typically draw their electrical energy from batteries or fuel cells. While conventional vehicles having an internal combustion engine (ICE) as their sole means of propulsion typically make do with a 12 V onboard voltage system, hybrid and electric vehicles having electric motors as drive unit require significantly higher voltages. This poses a serious additional risk potential for the direct region and the immediate surroundings of such high-voltage components, which plays an increasingly important role in technical specifications or else in standards. An important role is played here by the unambiguous marking of these dangerous regions in order thus to avoid unintentional contact with people, especially a driver, mechanic etc., with unambiguous color marking of such high-voltage assemblies in turn being particularly important.

For instance, at https://avt.inl.gov/sites/default/files/pdf/hev/hevtechspecr1.pdf, the Advanced Vehicle Team of the Idaho National Laboratory for HEV (Hybrid Electric Vehicle) has published a technical specification with recommendations for all apparatuses subject to a high voltage of not less than 60 V, including clear marking as HIGH VOLTAGE, and in this connection also suggests the color orange for marking.

However, due to the high processing temperatures of in some cases >300° C. during compounding and during injection molding, the choice of suitable colorants for the color orange is very limited, especially for technical thermoplastics.

WO 2005/084955 A1 discloses laser-weldable compositions based inter alia on polyamide comprising a dye, wherein the dye used may, for example, be Solvent Orange 60.

EP 0 827 986 A2 relates to bridged perinones, quinophthalones and perinone-quinophthalones, a process for preparation thereof and the use thereof for bulk coloring of plastics. Preferred plastics listed are polystyrene, styrene copolymers, polycarbonates and polymethacrylate; particular preference is given to polystyrene, polyethylene and polypropylene. Example 16 explicitly mentions 10,10'-oxybis-12H-phthaloperin-12-one.

EP 0 041 274 B1 describes fluorescent compositions capable of altering the wavelengths of the light, molded articles based on such compositions as light wave-transforming elements, and apparatuses for converting optical energy to electrical energy using such an element. The examples of EP 0 041 274 B1 use 12H-phthaloperin-12-one inter alia in polyethylene terephthalate (PET). Moreover, EP 0 041 274 B1 proposes the use in polyamides inter alia.

12H-Phthaloperin-12-one [CAS No. 6925-69-5], known as Solvent Orange 60, is obtainable for example as Macrolex® Orange 3G from Lanxess Deutschland GmbH, Cologne. However, a disadvantage is that under extreme demands, especially under the demands seen in electromobility, Solvent Orange 60 has a propensity to migrate out of the plastic matrix, which results in a decline in color intensity at elevated temperatures. The Solvent Orange 60 migrates to the surface of the plastic (blooming). From there it may be rubbed off, washed off or dissolved, may volatilize (fogging) or migrate into other materials (for example adjacent plastic or rubber parts) (bleeding). The concentration of the Solvent Orange 60 in the original plastic is reduced, thus causing a decline in color intensity. The migrated Solvent Orange 60 also has the disadvantage that it may be transported to adjacent components by mechanical or physical processes to cause performance impairment there. Examples include elevated electrical resistance in a switch contact which may result from deposition of Solvent Orange 60 on the surface of electrical contacts. In the field of electrical components, migration of ingredients out of plastics is therefore generally unwanted since it can affect the properties of the plastics and of spatially adjacent parts, with the result that the function of the electrical component is no longer assured in some cases.

Proceeding from the teaching of EP 0 041 274 B1, the problem addressed by the present invention was therefore that of providing orange polymer compositions based on polyamide for high-voltage components, especially for high-voltage components in electric vehicles, which are less prone to migration, especially bleeding, compared to the solution in EP 0 041 274 B1 based on 12H-phthaloperin-12-one. Ideally, orange polyamide-based high-voltage components of the invention should have improved lightfastness compared to products based on the prior art cited above, in that the original color achieved immediately after injection molding is retained under UV light over a longer period compared to 12H-phthaloperin-12-one-based components. Finally, improved thermal stability of the orange high-voltage components of the invention under thermal stress compared to 12H-phthaloperin-12-one-based components is desirable. Ideally, in one embodiment, orange high-voltage components of the invention should be laser-transparent/laser-transmitting for light wavelengths in the range from 800 nm to 1100 nm in order thus to allow the condition for transmission laser welding to another assembly absorbent in the recited wavelength range.

It has now been found that, surprisingly, high-voltage components, especially high-voltage components for electromobility, containing thermoplastic polymer compositions based on polyamide and 10,10'-oxybis-12H-phthaloperin-12-one [CAS No. 203576-97-0] of formula (I) meet the specified requirements.

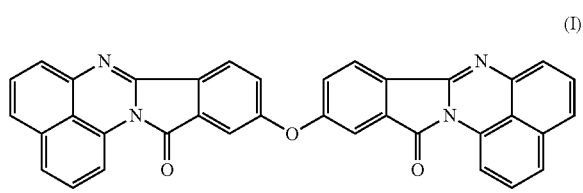 [SMILES: O=C1c2cc(Oc3ccc4c(c3)C(=O)N3C4=Nc4cccc5cccc3c45)ccc2C2=Nc3cccc4cccc(c34)N12]

(I)

Bleeding

In the context of the present invention, bleeding is ascertained as follows:

Plastic sheets having dimensions of 60·40·2 mm³ are first fabricated from a colorant-containing polyamide composition to be examined. A plasticized PVC film having dimensions of 30·20·2 mm³ is subsequently clamped between two of the initially fabricated plastic sheets and the entirety of all sheets is stored at 80° C. for 12 hours in a hot air drying cabinet. The colorant that has migrated from the two plastic sheets into the plasticized PVC is then subsequently assessed visually by the gray scale according to ISO 105-A02, with '5' meaning that the PVC film shows no color change (no visually discernible colorant transfer from the polyamide plastic sheets to the PVC film) and '1' meaning that the PVC film shows a significant color change (significant visually discernible colorant transfer from the polyamide plastic sheets to the PVC film).

Lightfastness

The measure of lightfastness used in the context of the present invention is discoloration after UV storage of above-described plastic sheets of a colorant-containing polyamide composition to be examined with UV light of the type from Suntest CPS+ with air-cooled Atlas Xenon lamp, 1500 watts, 45-130 klx, wavelength 300-800 nm and window glass filter 250-267 W/m² from Atlas Material Testing Technology GmbH, Linsengericht, Germany, and an irradiation time of 96 h. In the context of the present invention, discoloration was evaluated visually based on the blue wool scale according to DIN EN ISO 105-B02, with '8' representing exceptional lightfastness (little color change) and '1' representing very low lightfastness (significant color change).

Subject-Matter of the Invention

The invention provides polymer compositions comprising at least one polyamide and 10,10'-oxybis-12H-phthaloperin-12-one. Preference is given to those polymer compositions in which the nylon used is nylon-6 (PA6) or nylon-6,6 (PA66).

The invention additionally relates to the use of 10,10'-oxybis-12H-phthaloperin-12-one for marking polyamide-based products as high-voltage components.

However, the present invention also relates to the use of 10,10'-oxybis-12H-phthaloperin-12-one for marking polyamide-based high-voltage components, preferably high-voltage components for electromobility, with the signal color orange.

Preference is further given to polymer compositions in which, per 100 parts by mass of polyamide, 0.01 to 5 parts by mass, more preferably 0.01 to 3 parts by mass, of 10,10'-oxybis-12H-phthaloperin-12-one are used, with the proviso of a color distance ΔE<20 from the L*a*b* coordinates of a color number beginning with "2" in the RAL color chart, preferably a ΔE<10, more preferably ΔE<5, and a laser transparency of at least 10%.

The invention also provides high-voltage components, especially high-voltage components for electromobility, based on polymer compositions comprising at least one polyamide and 10,10'-oxybis-12H-phthaloperin-12-one, with the proviso of a color distance ΔE<20 from the L*a*b* coordinates of a color number beginning with "2" in the RAL color chart, preferably a ΔE<10, more preferably ΔE<5, and a laser transparency of at least 10%.

The invention also provides high-voltage components, especially high-voltage components for electromobility, based on polymer compositions comprising at least one polyamide and 10,10'-oxybis-12H-phthaloperin-12-one, in which the polyamide used is nylon-6 or nylon-6,6, with the proviso of a color distance ΔE<20 from the L*a*b* coordinates of a color number beginning with "2" in the RAL color chart, preferably a ΔE<10, more preferably ΔE<5, and a laser transparency of at least 10%.

The invention also provides high-voltage components, especially high-voltage components for electromobility, based on polymer compositions comprising, per 100 parts by mass of at least one polyamide, 0.01 to 5 parts by mass, more preferably 0.01 to 3 parts by mass, of 10,10'-oxybis-12H-phthaloperin-12-one, with the proviso of a color distance ΔE<20 from the L*a*b* coordinates of a color number beginning with "2" in the RAL color chart, preferably a ΔE<10, more preferably ΔE<5, and a laser transparency of at least 10%.

The present invention also relates to the use of 10,10'-oxybis-12H-phthaloperin-12-one for the production of polyamide-based polymer compositions, preferably polyamide-based high-voltage components, especially polyamide-based high-voltage components for electromobility, with the proviso of a color distance ΔE<20 from the L*a*b* coordinates of a color number beginning with "2" in the RAL color chart, preferably a ΔE<10, more preferably ΔE<5, and a laser transparency of at least 10%.

The polymer compositions of the invention are formulated for further use by mixing components A) and B) for use as reactants in at least one mixing apparatus. This affords, as intermediates, molding compounds based on the compositions of the invention. These molding compounds may either consist exclusively of components A) and B) or else may also contain at least one further component in addition to components A) and B).

For the sake of clarity it is noted that the scope of the present invention comprises all of the definitions and parameters recited below in general or specified in preferred ranges in any desired combinations. This likewise relates to the combination of the stated amounts for the individual components in relation to the processes and uses claimed. The standards recited in the context of this application relate to the edition current at the filing date of the present invention.

High Voltage

Regulation no. 100 of the United Nations Economic Commission for Europe (UNECE)—Uniform provisions concerning the approval of vehicles with regard to the specific requirements for the electric power train [2015/505], paragraph 2.17, describes the term "high voltage" as the classification of an electric component or a circuit, if its working voltage is >60 V and ≤ 1500 V (direct current) or >30 V and ≤ 1000 V (alternating current) root mean square (rms) (V=volts).

This classification of "high voltage" corresponds to voltage class B of ISO6469-3:2018 ("Electrically propelled road vehicles—Safety specifications—Part 3: Electrical safety"). Section 5.2 thereof also includes marking requirements for electrical components of voltage class B through appropriate hazard symbols or the color 'orange'.

High-Voltage Components and High-Voltage Components for Electromobility

According to the invention, "high-voltage component" is understood to mean components or products subjected to an operating voltage according to section 2.17 of the above-mentioned Regulation no. 100 of the United Nations Economic Commission for Europe (UNECE). According to the invention, "high-voltage components for electromobility" preferably refer to components in electric vehicles subjected to an operating voltage of not less than 30 V (direct current) or not less than 20 V (alternating current), more preferably—as per voltage class B of ISO6469-3:2018—an operating voltage of greater than 60 V direct current or greater than 30 V alternating current.

According to the invention, high-voltage components for electromobility include not only such components in direct contact with the voltage-conducting parts but also those that directly adjacent thereto or in spatial proximity thereto act as a touch guard, a warning marker or a shielding means, preference being given in accordance with the invention to components in direct contact with the voltage-conducting parts.

Inventive high-voltage components for electromobility are preferably colored orange, with particular preference for shades corresponding in the RAL color system to the color numbers RAL2001, RAL2003, RAL2004, RAL2007, RAL2008, RAL2009, RAL2010 and RAL2011, and very particular preference for the shades corresponding in the RAL color system to the color numbers RAL2003, RAL2008 and RAL2011.

"Similar shades" permissible in accordance with the invention are shades whose color distance in the L*a*b* system has a ΔE of <20, preferably a ΔE<10, more preferably ΔE<5, from a color number beginning with "2" in the RAL color chart. For elucidation of ΔE defined in EN ISO 11664-4 see, for example:

https://de.wikipedia.org/wiki/Delta_E.

In one embodiment of the present invention, the inventive high-voltage components for electromobility are designed by addition of further components such that they are absorbent for laser light having a wavelength in the range from 800 nm to 1100 nm, such that combination of one laser-transparent configuration and one laser-absorbent configuration confers laser weldability.

Orange

In the context of the present invention, orange is considered to mean a color which, in the RAL color system according to https://de.wikipedia.org/wiki/RAL-Farbe#Orange, has a color number beginning with a "2" in the RAL color chart. In particular, at the filing date of the present invention, a distinction is made between orange shades according to Tab. 1:

TABLE 1

|  |  | L* | a* | b* |
|---|---|---|---|---|
| RAL 2000 | Yellow orange | 58.20 | 37.30 | 68.68 |
| RAL 2001 | Red orange | 49.41 | 39.79 | 35.29 |
| RAL 2002 | Blood orange | 47.74 | 47.87 | 33.73 |
| RAL 2003 | Pastel orange | 66.02 | 41.22 | 52.36 |
| RAL 2004 | Pure orange | 56.89 | 50.34 | 49.81 |
| RAL 2005 | Luminous orange | 72.27 | 87.78 | 82.31 |
| RAL 2007 | Luminous bright orange | 76.86 | 47.87 | 97.63 |
| RAL 2008 | Bright red orange | 60.33 | 46.91 | 60.52 |
| RAL 2009 | Traffic orange | 55.83 | 47.79 | 48.83 |
| RAL 2010 | Signal orange | 55.39 | 40.10 | 42.42 |

TABLE 1-continued

|  |  | L* | a* | b* |
|---|---|---|---|---|
| RAL 2011 | Deep orange | 59.24 | 40.86 | 64.50 |
| RAL 2012 | Salmon orange | 57.75 | 40.28 | 30.66 |
| RAL 2013 | Pearl orange | 40.73 | 32.14 | 34.92 |

Tab. 1 shows the apparatus-independent CIE L*a*b* color values for the respective RAL value: L* stands for luminance, a*=D65 and b*=10°. The color model is standardized in EN ISO 11664-4 "Colorimetry—Part 4: CIE 1976 L*a*b* Colour space". For L*a*b* color space (also: CIELAB) see: https://de.wikipedia.org/wiki/Lab-Farbraum. Each color in the color space is defined by a color locus having the Cartesian coordinates {L*, a*, b*}. The a*b* coordinate plane was constructed using opponent color theory. Green and red are at opposite ends of the a* axis from one another and the b* axis runs from blue to yellow. Complementary shades are respectively opposite one another at a 180° angle; the midpoint between them (the coordinate origin a*=0, b*=0) is gray.

The L* axis describes the brightness (luminance) of the color with values of 0 to 100. In the diagram it stands perpendicular to the a*b* plane at the origin. It may also be referred to as the neutral gray axis since all achromatic colors (gray shades) are contained between the endpoints of black (L*=0) and white (L*=100). The a* axis describes the green or red fraction of a color, with negative values representing green and positive values representing red. The b* axis describes the blue or yellow fraction of a color, with negative values representing blue and positive values representing yellow.

The a* values range from approximately −170 to +100 and the b* values from −100 to +150, with the maximum values being achieved only at moderate brightness of certain shades. The CIELAB color solid has its greatest extent in the region of moderate brightness, although this differs in height and size depending on the color range.

The invention encompasses orange-like shades that have a color distance ΔE<20 between the L*a*b* coordinates of the polymer composition and the L*a*b* coordinates of a color number beginning with "2" in the RAL color chart, preferably a ΔE<10, more preferably ΔE<5.

Transmission Laser Welding

A further technical field of use for amorphous and semicrystalline polyamides is transmission laser welding, also known as laser transmission welding or laser welding for short. Transmission laser welding of plastics is based on radiation absorption in the molding compound. This is a joining process in which two joining partners generally made of thermoplastics are joined to one another on a molecular level. To this end one joining partner has a high transmission coefficient and the other a high absorption coefficient in the range of the laser wavelength used. The joining partner having the high transmission coefficient is irradiated by the laser beam substantially without heating. Upon contact with the joining partner having the high absorption coefficient the incident laser energy is absorbed in a near-surface layer, thus converting it into heat energy and melting the plastic. Owing to heat conduction processes the laser-transparent joining partner is also plasticized in the region of the joining zone. Customary laser sources used in laser transmission welding emit radiation in a wavelength range of approximately 600 to 1200 nm. High output diode lasers (HDL, λ=800-1100 nm) and solid-state lasers (for example Nd:YAG lasers, λ=1060-1090 nm) in particular are commonly used. Many non-additized polymers are largely transparent or translucent to laser radiation, i.e. they absorb only poorly. Suitable colorants, but also further additives, such as fillers and reinforcers, make it possible to control the absorption and thus the conversion of laser light into heat. Often added to the absorbent joining partner are absorbent pigments, which in the case of dark-colored joining partners are usually carbon black pigments. This approach is not possible for the laser-transparent joining partner since polymers colored with carbon black for example show insufficient transmission for the laser light. The same applies to many organic dyes, for example nigrosin. There is therefore a need for moldings which despite their coloring show a sufficient transmission for the laser light so that they may be used as the laser-transparent component in transmission laser welding.

The fundamental principles of transmission laser welding are known to those skilled in the art from Kunststoffe 87 (1997) 3, 348-350, Kunststoffe 87 (1997) 11, 1632-1640, Kunststoffe 88 (1998) 2, 210-121, Plastverarbeiter 46 (1995) 9, 42-46 and Plastverarbeiter 50 (1999) 4 18-19. The transmittance of a polymer molding for laser light having a wavelength of 600 to 1200 nm may be measured for example with a spectrophotometer and an integrating photometer sphere. This measurement setup also makes it possible to determine the diffuse fraction of the transmitted radiation. Suitable laser sources for laser transmission welding emit radiation in the abovementioned wavelength range of about 600 to 1200 nm and the abovementioned high output diode lasers or solid state lasers are used. With regard to the polyamide-based polymer compositions to be used in the production of the moldings for transmission laser welding, reference is made in full to the details that follow that, for the production of a laser-transparent molding, essentially no components absorbent in the wavelength range of the laser used for the transmission laser welding are used. This applies especially when at least one of components C) filler and reinforcer, D) flame retardant or E) additives are added to the composition for the laser-transparent molding. Preferably, for the production of the laser-transparent molding, no further additives E) that absorb or scatter in the wavelength range of relevance in the laser process are used in addition to component B) to be used in accordance with the invention.

Production of polyamide compositions for producing moldings for use for transmission laser welding is effected by processes known per se. These typically comprise first mixing the components in the relevant mass fractions. The mixing of components is preferably accomplished by conjoint blending, mixing, kneading, extruding or rolling at elevated temperatures. The temperature during mixing is preferably in a range from 220° C. to 340° C., more preferably in a range from 240° C. to 300° C. and especially in a range from 250° C. to 290° C. It may be advantageous to premix individual components. It is further also possible to directly produce the moldings from a physical mixture produced markedly below the melting temperature of the respective polyamide (dryblend) of premixed components and/or individual components. The temperature during mixing of dryblends is preferably in a range from 0° C. to 100° C., more preferably in a range from 10° C. to 50° C., especially at ambient temperature (25° C.+/−3° C.). The molding compounds may be processed to give moldings by customary processes, preferably by injection molding or extrusion.

At present, there is still no standard forming a basis on which a measurement of laser transparency has to be carried out. A person skilled in the art accordingly makes the measurement as follows: laser transparency is measured at 5 defined measuring sites on each of 5 sheets having dimensions of 60 mm·60 mm·2 mm and a highly polished surface. These values are used to calculate the average laser transparency. To this end the sheets are packaged in barrier PE bags (PE=polyethylene) before measurement and tested in the analyzer in the dry-as-molded state after 24 hours. See: K. D. Feddersen "Laserdurchstrahlschweißen—die Lösung für nicht lösbare Verbindungen" ["Laser Transmission Welding—the Solution for Unpartable Bonds" ], Österreichische Kunststoffzeitschrift 1/2 2018, pages 50-52. What is meant in the context of the present invention by the dry-as-molded state is that, immediately after the injection molding, the specimens to be examined in the context of the present invention are stored at 23±2° C. and a relative humidity of 50±10% for at least 16 hours and until performance of the respective study. With regard to the determination of water content, reference is made to ISO 15512: 2009-10.

Transparency of the specimens analyzed in the context of the present application was measured in the near infrared (NIR) at a laser wavelength of 980 nm in accordance with DVS-Richtlinie [German Welding Society information sheet] 2243 (01/2014) "Laserstrahlschweißen thermoplastischer Kunststoffe" ["Laser Beam Welding of Thermoplastics" ] using plaques having dimensions of 60 mm·60 mm·2 mm with the LPKF TMG3 transmittance analyzer from LPKF Laser & Electronics AG, Garbsen, Germany, calibrated beforehand with an analytical standard generated according to DIN EN ISO/IEC 17025; see: LPKF AG 101016-DE: "Einfache Transmissionsmessung für Kunststoffe LPKF TMG3" ["Simple Transmission Measurement for Plastics LPKF TMG3" ].

In the context of the present invention, "laser-transparent" or else "laser-transmitting" are used to describe polymer compositions or high-voltage components having a transmittance of at least 10% at a wavelength of 980 nm. In the context of the present invention, "laser-absorbent" is understood to mean that the transmittance by the above-described plaques having a thickness of 2 mm by the abovementioned method is less than 0.5%.

FURTHER PREFERRED EMBODIMENTS OF THE INVENTION

In a preferred embodiment, the invention relates to compositions or high-voltage components, especially high-voltage components for electromobility, comprising thermoplastic polymer compositions comprising, in addition to components A) and B), also C) at least one filler and/or reinforcer, preferably in an amount of 1 to 150 parts by mass, more preferably in an amount of 5 to 80 parts by mass, most preferably in an amount of 10 to 50 parts by mass, based in each case on 100 parts by mass of component A), with the proviso of a color distance ΔE<20 from the L*a*b* coordinates of a color number beginning with "2" in the RAL color chart and a laser transparency of at least 10%.

In a further preferred embodiment, the invention relates to compositions or high-voltage components, especially high-voltage components for electromobility, comprising thermoplastic polymer compositions comprising, in addition to components A) to C) or instead of C), also D) at least one flame retardant, preferably in an amount of 3 to 100 parts by mass, more preferably in an amount of 5 to 80 parts by mass, most preferably in an amount of 10 to 50 parts by mass, based in each case on 100 parts by mass of component A), with the proviso of a color distance ΔE<20 from the L*a*b* coordinates of a color number beginning with "2" in the RAL color chart and a laser transparency of at least 10%.

In a further preferred embodiment, the invention relates to compositions or high-voltage components, especially high-voltage components for electromobility, comprising thermoplastic polymer compositions comprising, in addition to components A) to E) or instead of C) and/or D), also E) at least one further additive other than components B), C) and D), preferably in an amount of 0.01 to 80 parts by mass, more preferably in an amount of 0.05 to 50 parts by mass, most preferably in an amount of 0.1 to 30 parts by mass, based in each case on 100 parts by mass of component A), with the proviso of a color distance ΔE<20 from the L*a*b* coordinates of a color number beginning with "2" in the RAL color chart and a laser transparency of at least 10%.

Component A)

The polyamides for use in accordance with the invention as component A) in the context of the present inventions may be produced by various methods and synthesized from different monomers. A multitude of procedures for preparing polyamides has become known, it being possible to use, depending on the desired end product, different monomer units and various chain transfer agents to establish a desired molecular weight or else monomers with reactive groups for aftertreatments intended at a later stage.

The processes of industrial relevance for the preparation of polyamides usually proceed via polycondensation in the melt. In this context, the hydrolytic polymerization of lactams is also considered to be polycondensation.

Useful reactants include aliphatic and/or aromatic dicarboxylic acids, such as adipic acid, 2,2,4- and 2,4,4-trimethyladipic acid, azelaic acid, sebacic acid, isophthalic acid, terephthalic acid, aliphatic and/or aromatic diamines, for example tetramethylenediamine, hexamethylenediamine, nonane-1,9-diamine, 2,2,4- and 2,4,4-trimethylhexamethylenediamine, the isomeric diaminodicyclohexylmethanes, diaminodicyclohexylpropanes, bisaminomethylcyclohexane, phenylenediamines, xylylenediamines, aminocarboxylic acids, for example aminocaproic acid, or the corresponding lactams. Particular preference is given to using caprolactams, especially ε-caprolactam. Copolyamides of a plurality of the monomers mentioned are included.

Preferred polyamides are semicrystalline polyamides that are preparable proceeding from diamines and dicarboxylic acids and/or lactams having at least 5 ring members or corresponding amino acids.

As particularly preferred polyamides are nylon-6, nylon-6,6, nylon-4,6 and/or semiaromatic copolyamides. Preferred semiaromatic copolyamides are PA6T/6, PA6T/66, PA6T/61 or PA6T/61/66.

Polyamides that are very particularly preferred in accordance with the invention are nylon-6 and nylon-6,6, and nylon-6 is very especially preferred.

The nomenclature of the polyamides used in the context of the present application corresponds to international standard ISO 1874-1, the first number(s) denoting the number of carbon atoms in the starting diamine and the last number(s) denoting the number of carbon atoms in the dicarboxylic acid. If only one number is stated, as in the case of PA6, this means that the starting material was an α,ω-aminocarboxylic acid or the lactam derived therefrom, i.e. ε-caprolactam in the case of PA6.

The PA6 [CAS No. 25038-54-4] for use with preference in accordance with the invention as component A) preferably has a viscosity number determinable to ISO 307 in a 0.5% by weight solution in 96% by weight sulfuric acid at 25° C. in the range from 80 to 180 ml/g, more preferably in the range from 85 to 160 ml/g and most preferably in the range from 90 to 140 ml/g. Nylon-6 for use with preference in accordance with the invention as component A) is available, for example, as Durethan® B26 at Lanxess Deutschland GmbH, Cologne.

A nylon-6,6 [CAS No. 32131-17-2] for use with preference as component A) preferably has a viscosity number determinable to ISO 307 in a 0.5% by weight solution in 96% by weight sulfuric acid at 25° C. in the range from 80 to 180 ml/g, even more preferably a viscosity number in the range from 85 to 160 ml/g, especially preferably in the range from 90 to 140 ml/g. Nylon-6,6 for use in accordance with the invention as component A) is available, for example, as Ultramid® A24E01 at BASF SE, Ludwigshafen.

The polyamide for use in accordance with the invention as component A) may also be used in a mixture with at least one other polyamide and/or at least one other polymer. Preferred other polymers are selected from the group of polyethylene, polypropylene and acrylonitrile-butadiene-styrene copolymer (ABS). In the case of use of at least one further polyamide or at least one other polymer, this is preferably or optionally combined with use of at least one compatibilizer.

It is possible to admix customary additives, preferably demolding agents, stabilizers and/or flow auxiliaries known to the person skilled in the art, already in molten form into the polyamide for use as component A).

Preference is therefore given in accordance with the invention to polymer compositions comprising at least nylon-6 and 10,10'-oxybis-12H-phthaloperin-12-one.

Preference is additionally given in accordance with the invention to polymer compositions comprising nylon-6,6 and 10,10'-oxybis-12H-phthaloperin-12-one.

Preference is further given to polymer compositions in which 0.01 to 5 parts by mass, more preferably 0.01 to 3 parts by mass, of 10,10'-oxybis-12H-phthaloperin-12-one are used per 100 parts by mass of nylon-6 or nylon-6,6.

Preference is further given to polymer compositions in which 0.01 to 5 parts by mass, more preferably 0.01 to 3 parts by mass, of 10,10'-oxybis-12H-phthaloperin-12-one are used per 100 parts by mass of nylon-6.

Preference is further given to polymer compositions in which 0.01 to 5 parts by mass, more preferably 0.01 to 3 parts by mass, of 10,10'-oxybis-12H-phthaloperin-12-one are used per 100 parts by mass of nylon-6,6.

The invention also provides high-voltage components, especially high-voltage components for electromobility, based on polymer compositions comprising at least one nylon-6 or nylon-6,6 and 10,10'-oxybis-12H-phthaloperin-12-one.

The invention also provides high-voltage components, especially high-voltage components for electromobility, based on polymer compositions comprising nylon-6 and 10,10'-oxybis-12H-phthaloperin-12-one.

The invention also provides high-voltage components, especially high-voltage components for electromobility, based on polymer compositions comprising nylon-6,6 and 10,10'-oxybis-12H-phthaloperin-12-one.

The invention also provides high-voltage components, especially high-voltage components for electromobility, based on polymer compositions containing 0.01 to 5 parts by mass, more preferably 0.01 to 3 parts by mass, of 10,10'-oxybis-12H-phthaloperin-12-one per 100 parts by mass of nylon-6 or nylon-6,6.

The invention also provides high-voltage components, especially high-voltage components for electromobility, based on polymer compositions containing 0.01 to 5 parts by mass, more preferably 0.01 to 3 parts by mass, of 10,10'-oxybis-12H-phthaloperin-12-one per 100 parts by mass of nylon-6.

The invention also provides high-voltage components, especially high-voltage components for electromobility, based on polymer compositions containing 0.01 to 5 parts by mass, more preferably 0.01 to 3 parts by mass, of 10,10'-oxybis-12H-phthaloperin-12-one per 100 parts by mass of nylon-6,6.

The invention also provides laser-transparent high-voltage components, especially high-voltage components for electromobility, having a laser transparency at a wavelength of 980 nm of at least 10%, based on polymer compositions comprising 0.01 to 3 parts by mass of 10,10'-oxybis-12H-phthaloperin-12-one per 100 parts by mass of nylon-6 or nylon-6,6, with the proviso of a color distance ΔE<20 from the L*a*b* coordinates of a color number beginning with "2" in the RAL color chart.

The invention also provides laser-transparent high-voltage components, especially high-voltage components for electromobility, having a laser transparency at a wavelength of 980 nm of at least 10%, based on polymer compositions comprising 0.01 to 3 parts by mass of 10,10'-oxybis-12H-phthaloperin-12-one per 100 parts by mass of nylon-6, with the proviso of a color distance ΔE<20 from the L*a*b* coordinates of a color number beginning with "2" in the RAL color chart.

The invention also provides laser-transparent high-voltage components, especially high-voltage components for electromobility, having a laser transparency at a wavelength of 980 nm of at least 10%, based on polymer compositions comprising 0.01 to 3 parts by mass of 10,10'-oxybis-12H-phthaloperin-12-one per 100 parts by mass of nylon-6,6, with the proviso of a color distance ΔE<20 from the L*a*b* coordinates of a color number beginning with "2" in the RAL color chart.

The invention also provides laser-absorbent high-voltage components, especially high-voltage components for electromobility, based on polymer compositions comprising 0.01 to 3 parts by mass of 10,10'-oxybis-12H-phthaloperin-12-one per 100 parts by mass of nylon-6 or nylon-6,6, and at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone, with the proviso of a color distance ΔE<20 from the L*a*b* coordinates of a color number beginning with "2" in the RAL color chart. Tin oxide, antimony trioxide or antimony tin oxide are particularly preferred. Antimony trioxide is very particularly preferred. The laser absorber for use as additive E) is preferably used in an amount of 0.01 to 80 parts by mass, more preferably in an amount of 0.05 to 50 parts by mass, most preferably in an amount of 0.1 to 30 parts by mass, based in each case on 100 parts by mass of component A).

The invention also provides laser-absorbent high-voltage components, especially high-voltage components for electromobility, based on polymer compositions comprising 0.01 to 3 parts by mass of 10,10'-oxybis-12H-phthaloperin-12-one per 100 parts by mass of nylon-6, and at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone, with the proviso of a color distance ΔE<20 from the L*a*b* coordinates of a color number beginning with "2" in the RAL color chart. Tin oxide, antimony trioxide or antimony tin oxide are particularly preferred. Antimony trioxide is very particularly preferred. The laser absorber for use as additive E) is preferably used in an amount of 0.01 to 80 parts by mass, more preferably in an amount of 0.05 to 50 parts by mass, most preferably in an amount of 0.1 to 30 parts by mass, based in each case on 100 parts by mass of component A).

The invention also provides laser-absorbent high-voltage components, especially high-voltage components for electromobility, based on polymer compositions comprising 0.01 to 3 parts by mass of 10,10'-oxybis-12H-phthaloperin-12-one per 100 parts by mass of nylon-6,6, and at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone, with the proviso of a color distance ΔE<20 from the L*a*b* coordinates of a color number beginning with "2" in the RAL color chart. Tin oxide, antimony trioxide or antimony tin oxide are particularly preferred. Antimony trioxide is very particularly preferred. The laser absorber for use as additive E) is preferably used in an amount of 0.01 to 80 parts by mass, more preferably in an amount of 0.05 to 50 parts by mass, most preferably in an amount of 0.1 to 30 parts by mass, based in each case on 100 parts by mass of component A).

The present invention also relates to the use of 10,10'-oxybis-12H-phthaloperin-12-one for the production of polymer compositions based on nylon-6 or nylon-6,6, preferably high-voltage components based on nylon-6 or nylon-6,6, especially high-voltage components based on nylon-6 or nylon-6,6 for electromobility.

The present invention also relates to the use of 10,10'-oxybis-12H-phthaloperin-12-one for the production of polymer compositions based on nylon-6, preferably high-voltage components based on nylon-6, especially high-voltage components based on nylon-6 for electromobility.

The present invention also relates to the use of 10,10'-oxybis-12H-phthaloperin-12-one for the production of polymer compositions based on nylon-6,6, preferably high-voltage components based on nylon-6,6, especially high-voltage components based on nylon-6,6 for electromobility.

The invention finally relates to the use of 10,10'-oxybis-12H-phthaloperin-12-one for marking products based on nylon-6 or nylon-6,6 as high-voltage components.

The invention finally relates to the use of 10,10'-oxybis-12H-phthaloperin-12-one for marking products based on nylon-6 as high-voltage components.

The invention finally relates to the use of 10,10'-oxybis-12H-phthaloperin-12-one for marking products based on nylon-6,6 as high-voltage components.

Component B)

According to the invention, component B) used is 10,10'-oxybis-12H-phthaloperin-12-one [CAS No. 203576-97-0] of the formula (I)

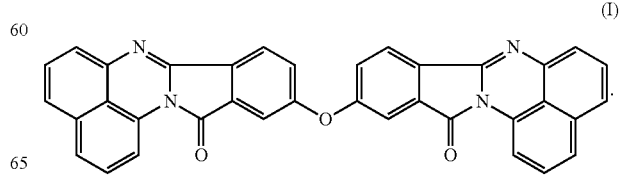

(I)

10,10'-Oxybis-12H-phthaloperin-12-one may either be prepared by the synthesis route specified in EP 1 118 640 A1 under example 3) or is obtainable from Angene International Limited, UK Office, Churchill House, London.

10,10'-Oxybis-12H-phthaloperin-12-one may be used directly in powder form or else in the form of a masterbatch, compact or concentrate, preference being given to masterbatches and particular preference to masterbatches in a polymer matrix corresponding to the particular component A).

Component C)

In a preferred embodiment, at least one filler or reinforcer is used as component C). It is also possible in this case to use mixtures of two or more different fillers and/or reinforcers.

Preference is given to using at least one filler or reinforcer from the group of carbon fibers [CAS No. 7440-44-0], glass beads or solid or hollow glass beads, or glass fibers, or ground glass, amorphous quartz glass, aluminum borosilicate glass having an alkali content of 1% (E glass) [CAS No. 65997-17-3], amorphous silica [CAS No. 7631-86-9], quartz flour [CAS No. 14808-60-7], calcium silicate [CAS No. 1344-95-2], calcium metasilicate [CAS No. 10101-39-0], magnesium carbonate [CAS No. 546-93-0], kaolin [CAS No. 1332-58-7], calcined kaolin [CAS No. 92704-41-1], chalk [CAS No. 1317-65-3], kyanite [CAS No. 1302-76-7], powdered or milled quartz [CAS No. 14808-60-7], mica [CAS No. 1318-94-1], phlogopite [CAS No. 12251-00-2], barium sulfate [CAS No. 7727-43-7], feldspar [CAS No. 68476-25-5], wollastonite [CAS No. 13983-17-0], montmorillonite [CAS No. 67479-91-8], pseudoboehmite of formula AlO(OH), magnesium carbonate [CAS No. 12125-28-9] and talc [CAS No. 14807-96-6].

Among the fibrous fillers or reinforcers, glass fibers and wollastonite are particularly preferred, very particular preference being given to glass fibers. In the case of a laser-absorbent component/laser absorbent high-voltage component, carbon fibers may also be used as filler or reinforcer.

With regard to the glass fibers, according to "http://de.wikipedia.org/wiki/Faser-Kunststoff-Verbund", a person skilled in the art will distinguish between chopped fibers, also called short fibers, having a length in the range from 0.1 to 1 mm, long fibers having a length in the range from 1 to 50 mm, and continuous fibers having a length L>50 mm. Short fibers are preferably used in injection molding technology and may be directly processed with an extruder. Long fibers can likewise still be processed in extruders. Said fibers are widely used in fiber spraying. Long fibers are frequently added to thermosets as a filler. Continuous fibers are used in the form of rovings or fabric in fiber-reinforced plastics. Products comprising continuous fibers achieve the highest stiffness and strength values. Also available are ground glass fibers, the length of which after grinding is typically in the range from 70 to 200 µm.

Glass fibers to be used with preference in accordance with the invention as component C) are chopped long glass fibers having an average starting length to be determined by laser diffraction-particle size analysis (laser granulometry/laser diffractometry) according to ISO 13320 in the range from 1 to 50 mm, more preferably in the range from 1 to 10 mm, most preferably in the range from 2 to 7 mm. For laser diffraction particle size determination/laser diffractometry according to standard ISO 13320 see:

https://de.wikipedia.org/wiki/Laserbeugungs-Partikelgr%C3%B6%C3%9Fenanalyse

Preferred glass fibers for use as component C) have an average fiber diameter to be determined by laser diffractometry according to ISO 13320 in the range from 7 to 18 µm, more preferably in the range from 9 to 15 µm.

In a preferred embodiment, the glass fibers for use with preference as component C) are modified with a suitable size system or an adhesion promoter/adhesion promoter system. Preference is given to using a size system or an adhesion promoter based on silane. Particularly preferred silane-based adhesion promoters for the treatment of the glass fibers for use with preference as component C) are silane compounds of general formula (II)

$$(X-(CH_2)_q)_k-Si-(O-C_rH_{2r+1})_{4-k} \qquad (II)$$

in which

X is $NH_2-$, carboxyl-, HO— or

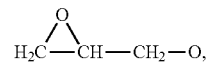

q in formula (XI) represents an integer from 2 to 10, preferably 3 to 4, r in formula (XI) represents an integer from 1 to 5, preferably 1 to 2, and k in formula (XI) represents an integer from 1 to 3, preferably 1.

Especially preferred adhesion promoters are silane compounds from the group of aminopropyltrimethoxysilane, aminobutyltrimethoxysilane, aminopropyltriethoxysilane, aminobutyltriethoxysilane, and the corresponding silanes containing a glycidyl group or a carboxyl group as the X substituent, very particular preference especially being given to carboxyl groups.

For the modification of the glass fibers for use with preference as component C), the adhesion promoter, preferably the silane compounds of formula (II), is used preferably in amounts of 0.05% to 2% by weight, more preferably in amounts of 0.25% to 1.5% by weight and most preferably in amounts of 0.5% to 1% by weight, based in each case on 100% by weight of component C).

The glass fibers to be used with preference as component C), as a result of the processing to give the composition or to give the product, may be shorter in the composition or in the product than the glass fibers originally used. Thus, the arithmetic average of the glass fiber length after processing, to be determined by high-resolution x-ray computed tomography, is frequently only in the range from 150 µm to 300 µm.

According to "http://www.r-g.de/wiki/Glasfasern", glass fibers are produced in the melt spinning process (die drawing, rod drawing and die blowing processes). In the die drawing process, the hot mass of glass flows under gravity through hundreds of die bores of a platinum spinneret plate. The filaments can be drawn at a speed of 3-4 km/minute with unlimited length.

Those skilled in the art distinguish between different types of glass fibers, some of which are listed here by way of example:

E glass, the most commonly used material with optimal cost-benefit ratio (E glass from R&G) with a composition according to https://www.r-g.de/wiki/Glasfasern of 53-55% $SiO_2$, 14-15% $Al_2O_3$, 6-8% $B_2O_3$, 17-22% CaO, <5% MgO, <1% $K_2O$ or $Na_2O$ and about 1% other oxides;

H glass, hollow glass fibers for reduced weight (R&G hollow glass fiber weave 160 g/m² and 216 g/m²);

R, S glass, for elevated mechanical demands (S2 glass from R&G);

D glass, borosilicate glass for elevated electrical demands;

C glass, having increased chemical resistance;

quartz glass, having high thermal stability.

Further examples can be found at "http://de.wikipedia.org/wiki/Glasfaser". E glass fibers have gained the greatest significance for reinforcement of plastics. E stands for electrical glass, since it was originally used in the electrical industry in particular. For the production of E glass, glass melts are produced from pure quartz with additions of limestone, kaolin and boric acid. As well as silicon dioxide, they contain different amounts of various metal oxides. The composition determines the properties of the products. Preference is given in accordance with the invention to using at least one type of glass fibers from the group of E glass, H glass, R, S glass, D glass, C glass and quartz glass, particular preference being given to glass fibers made of E glass.

Glass fibers made of E glass are the most commonly used reinforcing material. The strength characteristics correspond to those of metals (for example aluminum alloys), with a lower specific weight of laminates containing E glass fibers than that of metals. E glass fibers are nonflammable, heat resistant up to about 400° C. and stable to most chemicals and weathering effects.

Further preferably used as component C) are also acicular mineral fillers. Acicular mineral fillers are understood in accordance with the invention to mean a mineral filler with highly pronounced acicular character. The acicular mineral filler for use with preference as component C) is wollastonite. The acicular mineral filler preferably has a length: diameter ratio to be determined by high-resolution x-ray computed tomography in the range from 2:1 to 35:1, more preferably in the range from 3:1 to 19:1, especially preferably in the range from 4:1 to 12:1. The average particle size of the acicular mineral fillers for determination by high-resolution x-ray computed tomography is preferably less than 20 µm, more preferably less than 15 µm, especially preferably less than 10 µm.

Preference is also given to using, as component C), non-fibrous and non-foamed milled glass having a particle size distribution to be determined by laser diffractometry according to ISO 13320 having a d90 in the range from 5 to 250 µm, preferably in the range from 10 to 150 µm, more preferably in the range from 15 to 80 µm, most preferably in the range from 16 to 25 µm. With regard to the d90 values, their determination and their significance, reference is made to Chemie Ingenieur Technik (72) pp. 273-276, 3/2000, Wiley-VCH Verlags GmbH, Weinheim, 2000, according to which the d90 value is that particle size below which 90% of the amount of particles lie.

It is preferable in accordance with the invention when the non-fibrous and non-foamed milled glass has a particulate, non-cylindrical shape and has a length to thickness ratio to be determined by laser diffractometry according to ISO 13320 of less than 5, preferably less than 3, more preferably less than 2. It will be appreciated that the value of zero is impossible.

The non-foamed and non-fibrous milled glass for use with particular preference as component C) is additionally characterized in that it does not have the glass geometry typical of fibrous glass with a cylindrical or oval cross section having a length to diameter ratio (L/D ratio) to be determined by laser diffractometry according to ISO 13320 greater than 5.

The non-foamed and non-fibrous milled glass for use with particular preference in accordance with the invention as component C) is preferably obtained by grinding glass with a mill, preferably a ball mill, and more preferably with subsequent sifting or sieving. Preferred starting materials for the milling of the non-fibrous and non-foamed milled glass for use as component C) in one embodiment also include glass wastes as generated as unwanted by-product and/or as off-spec primary product (called offspec material) especially in the production of glass products. These especially include waste glass, recycled glass and broken glass as can be obtained especially in the production of window or bottle glass, and in the production of glass-containing fillers and reinforcers, especially in the form of what are called melt cakes. The glass may be colored, but preference is given to non-colored glass as the starting material for use as component C).

Components D)

In a preferred embodiment, at least one flame retardant is used as component D). Preferred flame retardants are mineral flame retardants, nitrogen-containing flame retardants or phosphorus-containing flame retardants other than component C).

Among the mineral flame retardants, magnesium hydroxide is particularly preferred. Magnesium hydroxide [CAS No. 1309-42-8] may be impure as a result of its origin and mode of production. Typical impurities include, for example, silicon-, iron-, calcium- and/or aluminum-containing species which may be intercalated, for example, in the form of oxides in the magnesium hydroxide crystals. The magnesium hydroxide for use as a mineral flame retardant may be unsized or else sized. The magnesium hydroxide for use as a mineral flame retardant is preferably provided with sizes based on stearates or aminosiloxanes, more preferably with aminosiloxanes. Magnesium hydroxide for use with preference as a mineral flame retardant has a median particle size d50 to be determined by laser diffractometry according to ISO 13320 in the range from 0.5 µm to 6 µm, preference being given to a d50 in the range from 0.7 µm to 3.8 µm and particular preference to a d50 in the range from 1.0 µm to 2.6 µm.

Magnesium hydroxide types suitable as a mineral flame retardant according to the invention include for example Magnifin® H5IV from Martinswerk GmbH, Bergheim, Germany or Hidromag® Q2015 TC from Penoles, Mexico City, Mexico.

Preferred nitrogen-containing flame retardants are the reaction products of trichlorotriazine, piperazine and morpholine of CAS No. 1078142-02-5, especially MCA PPM Triazine HF from MCA Technologies GmbH, Biel-Benken, Switzerland, also melamine cyanurate and condensation products of melamine, especially melem, melam, melon or more highly condensed compounds of this type. Preferred inorganic nitrogen-containing compounds are ammonium salts.

In addition, it is also possible to use salts of aliphatic and aromatic sulfonic acids and mineral flame retardant additives, especially aluminum hydroxide or Ca—Mg carbonate hydrates (DE-A 4236122).

Also suitable for use as component D) are flame retardant synergists from the group of oxygen-, nitrogen- or sulfur-containing metal compounds. Preferred among these are zinc-free compounds, especially molybdenum oxide, magnesium oxide, magnesium carbonate, calcium carbonate, calcium oxide, titanium nitride, magnesium nitride, calcium phosphate, calcium borate, magnesium borate or mixtures thereof.

However, in an alternative embodiment, it is also possible to use zinc-containing compounds as component D) if required. These preferably include zinc oxide, zinc borate, zinc stannate, zinc hydroxystannate, zinc sulfide and zinc nitride, or mixtures thereof.

Preferred phosphorus-containing flame retardants are organic metal phosphinates, aluminum salts of phosphonic acid, red phosphorus, inorganic metal hypophosphites, metal phosphonates, derivatives of 9,10-dihydro-9-oxa-10-phosphaphenanthrene 10-oxides (DOPO derivatives), resorcinol bis(diphenyl phosphate) (RDP) including oligomers, bisphenol A bis(diphenyl phosphate) (BDP) including oligomers, melamine pyrophosphate, melamine polyphosphate, melamine poly(aluminum phosphate), melamine poly(zinc phosphate) or phenoxyphosphazene oligomers and mixtures thereof.

A preferred organic metal phosphinate is aluminum tris(diethylphosphinate). A preferred inorganic metal hypophosphite is aluminum hypophosphite.

Further flame retardants for use as component D) are char formers, more preferably phenol-formaldehyde resins, polycarbonates, polyimides, polysulfones, polyether sulfones or polyether ketones, and also antidrip agents, especially tetrafluoroethylene polymers.

The flame retardants for use as component D) may be added in pure form, or else via masterbatches or compactates.

However, in an alternative embodiment—if required and taking into account the disadvantages of loss of freedom from halogen of the flame retardants—halogen-containing flame retardants may also be used as flame retardants. Preferred halogen-containing flame retardants are commercially available organic halogen compounds, more preferably ethylene-1,2-bistetrabromophthalimide, decabromodiphenylethane, tetrabromobisphenol A epoxy oligomer, tetrabromobisphenol A oligocarbonate, tetrachlorobisphenol A oligocarbonate, polypentabromobenzyl acrylate, brominated polystyrene or brominated polyphenylene ethers, which can be used alone or in combination with synergists, especially antimony trioxide or antimony pentoxide, and wherein among the halogen-containing flame retardants brominated polystyrene is particularly preferred. Brominated polystyrene is used here preferably in amounts in the range from 10% to 30% by weight, more preferably in amounts in the range from 15% to 25% by weight, based in each case on the overall composition, where at least one of the other components is reduced to such an extent that the sum total of all weight percentages is always 100.

Brominated polystyrene is commercially available in a very wide variety of product qualities. Examples thereof are for example Firemaster® PBS64 from Lanxess, Cologne, Germany and Saytex® HP-3010 from Albemarle, Baton Rouge, USA.

Among the flame retardants for use as component D), very particular preference is given to aluminum tris(diethylphosphinate) [CAS No. 225789-38-8] and the combination of aluminum tris(diethylphosphinate) and melamine polyphosphate or the combination of aluminum tris(diethylphosphinate) and at least one aluminum salt of phosphonic acid, the latter combination being especially preferred.

Aluminum tris(diethylphosphinate) [CAS No. 225789-38-8] or the combinations of aluminum tris(diethylphosphinate) and melamine polyphosphate or of aluminum tris (diethylphosphinate) and at least one aluminum salt of phosphonic acid are used here preferably in an amount of 5-35% by weight, more preferably in an amount of 10-30% by weight, most preferably in an amount of 15-25% by weight, based in each case on the overall composition, wherein at least one of the other components is reduced to such an extent that all weight percentages always add up to 100.

In the case of the combinations of aluminum tris(diethylphosphinate) and melamine polyphosphate or of aluminum tris(diethylphosphinate) and at least one aluminum salt of phosphonic acid, the proportion of aluminum tris(diethylphosphinate) is preferably 40-90 parts by weight, more preferably 50-80 parts by weight, most preferably 60-70 parts by weight, based in each case on 100 parts by weight of the combination of aluminum tris(diethylphosphinate) and melamine polyphosphate or the combination of aluminum tris(diethylphosphinate) and at least one aluminum salt of phosphonic acid.

An example of a suitable aluminum tris(diethylphosphinate) for use as component D) is Exolit® OP1230 or Exolit® OP1240 from Clariant International Ltd. Muttenz, Switzerland. Melamine polyphosphate is commercially available in a wide variety of product qualities. Examples thereof are for example Melapur® 200/70 from BASF, Ludwigshafen, Germany, and also Budit® 3141 from Budenheim, Budenheim, Germany.

Preferred aluminum salts of phosphonic acid are selected from the group of
primary aluminum phosphonate $[Al(H_2PO_3)_3]$,
basic aluminum phosphonate $[Al(OH)H_2PO_3)_2 \cdot 2H_2O]$,
$Al_2(HPO_3)_3$-x $Al_2O_3$-n $H_2O$ where x is in the range from 2.27 to 1 and n is in the range from 0 to 4, $$Al_2(HPO_3)_3 \cdot (H_2O)_q \quad (III)$$

where q is in the range from 0 to 4, especially aluminum phosphonate tetrahydrate $[Al_2(HPO_3)_3 \cdot 4H_2O]$ or secondary aluminum phosphonate $[Al_2(HPO_3)_3]$, $$Al_2M_z(HPO_3)_y(OH)_v \cdot (H_2O)_w \quad (IV)$$

in which M represents alkali metal ion(s) and z is in the range from 0.01 to 1.5, y is in the range from 2.63-3.5, v is in the range from 0 to 2 and w is in the range from 0 to 4, and $$Al_2(HPO_3)_u(H_2PO_3)_t \cdot (H_2O)_s \quad (V)$$

in which u is in the range from 2 to 2.99, t is in the range from 2 to 0.01 and s is in the range from 0 to 4, where z, y and v in formula (IV) and u and t in formula (V) can assume only such numbers that the corresponding aluminum salt of phosphonic acid as a whole is uncharged.

Preferred alkali metals M in formula (IV) are sodium and potassium.

The aluminum salts of phosphonic acid described may be used individually or in a mixture.

Particularly preferred aluminum salts of phosphonic acid are selected from the group of
primary aluminum phosphonate $[Al(H_2PO_3)_3]$,
secondary aluminum phosphonate $[Al_2(HPO_3)_3]_3$,
basic aluminum phosphonate $[Al(OH)H_2PO_3)_2 \cdot 2H_2O]$,
aluminum phosphonate tetrahydrate $[Al_2(HPO_3)_3 \cdot 4H_2O]$ and
$Al_2(HPO_3)_3 \cdot x$ $Al_2O_3 \cdot n$ $H_2O$ where x is in the range from 2.27 to 1 and n is in the range from 0 to 4.

Very particular preference is given to secondary aluminum phosphonate $Al_2(HPO_3)_3$ [CAS No. 71449-76-8] and secondary aluminum phosphonate tetrahydrate $Al_2(HPO_3)_3 \cdot 4H_2O$ [CAS No. 156024-71-4], secondary aluminum phosphonate $Al_2(HPO_3)_3$ being especially preferred.

The preparation of aluminum salts of phosphonic acid for use in accordance with the invention as component D) is described, for example, in WO 2013/083247 A1. It typically comprises reacting an aluminum source, preferably aluminum isopropoxide, aluminum nitrate, aluminum chloride or aluminum hydroxide, with a phosphorus source, preferably phosphonic acid, ammonium phosphonate, alkali metal phosphonate, and optionally with a template in a solvent at 20° C. to 200° C. over a period of up to 4 days. To this end the aluminum source and the phosphorus source are mixed, heated under hydrothermal conditions or under reflux, filtered, washed and dried. Preferred templates are hexane-1, 6-diamine, guanidine carbonate or ammonia. A preferred solvent is water.

Component E)

Component E) used is at least one further additive other than components B) to D). Preferred additives for use as component E) are antioxidants, thermal stabilizers, UV stabilizers, gamma ray stabilizers, components for reducing water absorption or hydrolysis stabilizers, antistats, emulsifiers, nucleating agents, plasticizers, processing auxiliaries, impact modifiers, lubricants and/or demolding agents, components for reducing water absorption, flow auxiliaries or elastomer modifiers, chain-extending additives, colorants other than components B), and in the case of laser-absorbent components or high-voltage components laser absorbers. The additives may be used alone or in a mixture, or in the form of masterbatches.

Preferred heat stabilizers of component E) are sterically hindered phenols, especially those containing at least one 2,6-di-tert-butylphenyl group and/or 2-tert-butyl-6-methylphenyl group, and also phosphites, hypophosphites, especially sodium hypophosphite $NaH_2PO_2$, hydroquinones, aromatic secondary amines, substituted resorcinols, salicylates, benzotriazoles and benzophenones, 3,3'-thiodipropionates and variously substituted representatives of these groups or mixtures thereof.

In one embodiment, thermal stabilizers used in component E) may also be copper salts, preferably in combination with sodium hypophosphite $NaH_2PO_2$. The copper salt used is preferably copper(I) iodide [CAS No. 7681-65-4] and/or (triphenylphosphino)copper iodide [CAS No. 47107-74-4]. Preference is given to using the copper salts in combination with sodium hypophosphite $NaH_2PO_2$ or with at least one alkali metal iodide. Preferred alkali metal iodide is potassium iodide [CAS No. 7681-11-0].

Thermal stabilizers for use as component E) are used preferably in an amount of 0.01 to 2 parts by mass, more preferably in an amount of 0.05 to 1 part by mass, based in each case on 100 parts by mass of component A).

UV stabilizers for use as component E) are preferably substituted resorcinols, salicylates, benzotriazoles and benzophenones, HALS derivatives ("Hindered Amine Light Stabilizers") containing at least one 2,2,6,6-tetramethyl-4-piperidyl unit or benzophenones.

UV stabilizers for use as component E) are used preferably in an amount of 0.01 to 2 parts by mass, more preferably in an amount of 0.1 to 1 part by mass, based in each case on 100 parts by mass of component A).

Colorants other than component B) that are to be used as component E) are preferably inorganic pigments, especially ultramarine blue, bismuth vanadate, iron oxide, titanium dioxide, zinc sulfide, zinc-titanium-zinc oxides [CAS No. 923954-49-8], and also organic dyes, preferably phthalocyanines, quinacridones, benzimidazoles, especially Ni-4-hydroxynaphthylbenzimidazole [CAS No. 42844-93-9] and/or pyrimidineazobenzimidazole [CAS No. 72102-84-2] and/or Pigment Yellow 192 [CAS No. 56279-27-7], and also perylenes, anthraquinones, especially C.I. Solvent Yellow 163 [CAS No. 13676-91-0], this enumeration being non-conclusive.

In one embodiment, preferably in the case of a laser-absorbent component/high-voltage component, carbon black or nigrosin are also used as colorant.

Nucleating agents for use as component E) are preferably sodium phenylphosphinate or calcium phenylphosphinate, aluminum oxide or silicon dioxide, and most preferably talc, this enumeration being non-conclusive.

Flow auxiliaries for use as component E) are preferably copolymers of at least one α-olefin with at least one methacrylic ester or acrylic ester of an aliphatic alcohol. Particular preference is given here to copolymers in which the α-olefin has been formed from ethene and/or propene and the methacrylic ester or acrylic ester contains, as its alcohol component, linear or branched alkyl groups having 6 to 20 carbon atoms. Very particular preference is given to 2-ethylhexyl acrylate. Features of the copolymers suitable as flow auxiliaries are not just their composition but also their low molecular weight. Accordingly, suitable copolymers for the compositions that are to be protected from thermal degradation in accordance with the invention are particularly those which have an MFI value measured at 190° C. and a load of 2.16 kg of at least 100 g/10 min, preferably of at least 150 g/10 min, more preferably of at least 300 g/10 min. The MFI, melt flow index, characterizes the flow of a melt of a thermoplastic and is subject to the standards ISO 1133 or ASTM D 1238. A flow auxiliary used with especial preference is a copolymer of ethene and 2-ethylhexyl acrylate having an MFI of 550 and known as Lotryl® 37EH550.

Chain-extending additives for use as component E) are preferably di- or polyfunctional branching or chain-extending additives containing at least two branching or chain-extending functional groups per molecule. Preferred branching or chain-extending additives include low molecular weight or oligomeric compounds which have at least two chain-extending functional groups per molecule which are capable of reacting with primary and/or secondary amino groups and/or amide groups and/or carboxylic acid groups. Chain-extending functional groups are preferably isocyanates, alcohols, blocked isocyanates, epoxides, maleic anhydride, oxazoline, oxazine, oxazolone, preference being given to epoxides.

Especially preferred di- or polyfunctional branching or chain-extending additives are diepoxides based on diglycidyl ethers (bisphenol and epichlorohydrin), based on amine epoxy resin (aniline and epichlorohydrin), based on diglycidyl esters (cycloaliphatic dicarboxylic acids and epichlorohydrin), separately or in mixtures, and also 2,2-bis[p-hydroxyphenyl]propane diglycidyl ether, bis[p-(N-methyl-N-2,3-epoxypropylamino)phenyl]methane and epoxidized fatty acid esters of glycerol comprising at least two epoxy groups per molecule.

Particularly preferred di- or polyfunctional branching or chain-extending additives are glycidyl ethers, most preferably bisphenol A diglycidyl ether [CAS No. 98460-24-3], or epoxidized fatty acid esters of glycerol, and also most preferably epoxidized soya oil [CAS No. 8013-07-8] and/or epoxidized linseed oil.

Plasticizers for use with preference as component E) are dioctyl phthalate, dibenzyl phthalate, butyl benzyl phthalate, hydrocarbon oils or N-(n-butyl)benzenesulfonamide.

Elastomer modifiers to be used with preference as component E) include one or more graft polymers of E.1 5% to 95% by weight, preferably 30% to 90% by weight, of at least one vinyl monomer and E.2 95% to 5% by weight, preferably 70% to 10% by weight, of one or more graft bases having glass transition temperatures <10° C., preferably <0° C., more preferably <−20° C., where the percentages by weight are based on 100% by weight of elastomer modifier.

The graft base E.2 generally has an average particle size d50 value to be determined by laser diffractometry according to ISO 13320 of 0.05 to 10 μm, preferably 0.1 to 5 μm, more preferably 0.2 to 1 μm.

Monomers E.1 are preferably mixtures of

E.1.1 50% to 99% by weight of vinylaromatics and/or ring-substituted vinylaromatics, especially styrene, α-methylstyrene, p-methylstyrene, p-chlorostyrene, and/or ($C_1$-$C_8$)-alkyl methacrylates, especially methyl methacrylate, ethyl methacrylate and E.1.2 1% to 50% by weight of vinyl cyanides, especially unsaturated nitriles such as acrylonitrile and methacrylonitrile, and/or ($C_1$-$C_8$)-alkyl (meth)acrylates, especially methyl methacrylate, glycidyl methacrylate, n-butyl acrylate, t-butyl acrylate, and/or derivatives, especially anhydrides and imides of unsaturated carboxylic acids, especially maleic anhydride or N-phenylmaleimide, where the percentages by weight are based on 100% by weight of elastomer modifier.

Preferred monomers E.1.1 are to be selected from at least one of the monomers styrene, α-methylstyrene and methyl methacrylate; preferred monomers E.1.2 are selected from at least one of the monomers acrylonitrile, maleic anhydride, glycidyl methacrylate and methyl methacrylate. Particularly preferred monomers are E.1.1 styrene and E.1.2 acrylonitrile.

Graft bases E.2 suitable for the graft polymers for use in the elastomer modifiers are, for example, diene rubbers, EPDM rubbers, i.e. those based on ethylene/propylene and optionally diene, and also acrylate, polyurethane, silicone, chloroprene and ethylene/vinyl acetate rubbers. EPDM stands for ethylene-propylene-diene rubber.

Preferred graft bases E.2 are diene rubbers, especially based on butadiene, isoprene, etc., or mixtures of diene rubbers or copolymers of diene rubbers or mixtures thereof with further copolymerizable monomers, especially of E.1.1 and E.1.2, with the proviso that the glass transition temperature of component E.2 is <10° C., preferably <0° C., more preferably <−10° C.

Particularly preferred graft bases E.2 are ABS polymers (emulsion, bulk and suspension ABS), where ABS stands for acrylonitrile-butadiene-styrene, as described, for example, in DE-A 2 035 390 or in DE-A 2 248 242 or in Ullmann, Enzyklopädie der Technischen Chemie, vol. 19 (1980), p. 277-295. The gel content of the graft base E.2 is preferably at least 30% by weight, more preferably at least 40% by weight (measured in toluene).

The elastomer modifiers/graft polymers for use as component E) are produced by free-radical polymerization, preferably by emulsion, suspension, solution or bulk polymerization, especially by emulsion or bulk polymerization.

Particularly suitable graft rubbers also include ABS polymers, which are produced by redox initiation with an initiator system composed of organic hydroperoxide and ascorbic acid according to U.S. Pat. No. 4,937,285.

Since, as is well known, the graft monomers are not necessarily completely grafted onto the graft base in the grafting reaction, graft polymers are also understood in accordance with the invention to mean those products that result from (co)polymerization of the graft monomers in the presence of the graft base and are also obtained in the workup.

Likewise suitable acrylate rubbers are based on graft bases E.2 that are preferably polymers of alkyl acrylates, optionally having up to 40% by weight, based on E.2, of other polymerizable, ethylenically unsaturated monomers. The preferred polymerizable acrylic esters include $C_1$-$C_8$-alkyl esters, preferably methyl, ethyl, butyl, n-octyl and 2-ethylhexyl esters; haloalkyl esters, preferably halo-$C_1$-$C_8$-alkyl esters, such as chloroethyl acrylate, glycidyl esters, and mixtures of these monomers. Graft polymers comprising butyl acrylate as the core and methyl methacrylates as the shell, especially Paraloid® EXL2300 from Dow Corning Corporation, Midland Mich., USA, are particularly preferred.

As an alternative to the ethylenically unsaturated monomers, crosslinking may be achieved by copolymerizing monomers having more than one polymerizable double bond. Preferred crosslinking monomers are esters of unsaturated monocarboxylic acids having 3 to 8 carbon atoms and unsaturated monohydric alcohols having 3 to 12 carbon atoms, or of saturated polyols having 2 to 4 OH groups and 2 to 20 carbon atoms, preferably ethylene glycol dimethacrylate, allyl methacrylate; polyunsaturated heterocyclic compounds, preferably trivinyl cyanurate and triallyl cyanurate; polyfunctional vinyl compounds, preferably di- and trivinylbenzenes; but also triallyl phosphate and diallyl phthalate.

Particularly preferred crosslinking monomers are allyl methacrylate, ethylene glycol dimethacrylate, diallyl phthalate and heterocyclic compounds having at least 3 ethylenically unsaturated groups.

Very particularly preferred crosslinking monomers are the cyclic monomers triallyl cyanurate, triallyl isocyanurate, triacryloylhexahydro-s-triazine, triallylbenzenes. The amount of the crosslinked monomers is preferably 0.02% to 5% by weight, especially 0.05% to 2% by weight, based on the graft base E.2.

In the case of cyclic crosslinking monomers having at least 3 ethylenically unsaturated groups, it is advantageous to restrict the amount to less than 1% by weight of the graft base E.2.

Preferred "other" polymerizable, ethylenically unsaturated monomers which, in addition to the acrylic esters, may optionally be used to produce the graft base E.2 are acrylonitrile, styrene, α-methylstyrene, acrylamides, vinyl $C_1$-$C_6$-alkyl ethers, methyl methacrylate, glycidyl methacrylate, butadiene. Preferred acrylate rubbers as graft base E.2 are emulsion polymers having a gel content of at least 60% by weight.

Further preferably suitable graft bases E.2 are silicone rubbers having graft-active sites, such as are described in DE-A 3 704 657, DE-A 3 704 655, DE-A 3 631 540 and DE-A 3 631 539.

Preferred graft polymers with a silicone content are those having methyl methacrylate or styrene-acrylonitrile as the shell and a silicone/acrylate graft as the core. Styrene-acrylonitrile to be used with preference as the shell is Metablen® SRK200. Methyl methacrylate to be used with preference as the shell is Metablen® S2001 or Metablen® S2030 or Metablen® SX-005. Particular preference is given to using Metablen® S2001. The products having the Metablen® trade name are available from Mitsubishi Rayon Co., Ltd., Tokyo, Japan.

Crosslinking may be achieved by copolymerizing monomers having more than one polymerizable double bond. Preferred examples of crosslinking monomers are esters of unsaturated monocarboxylic acids having 3 to 8 carbon atoms and unsaturated monohydric alcohols having 3 to 12 carbon atoms, or of saturated polyols having 2 to 4 OH groups and 2 to 20 carbon atoms, preferably ethylene glycol dimethacrylate, allyl methacrylate; polyunsaturated heterocyclic compounds, preferably trivinyl cyanurate and triallyl cyanurate; polyfunctional vinyl compounds, preferably di- and trivinylbenzenes; but also triallyl phosphate and diallyl phthalate.

Preferred crosslinking monomers are allyl methacrylate, ethylene glycol dimethacrylate, diallyl phthalate and heterocyclic compounds having at least 3 ethylenically unsaturated groups.

Particularly preferred crosslinking monomers are the cyclic monomers triallyl cyanurate, triallyl isocyanurate, triacryloylhexahydro-s-triazine, triallylbenzenes. The amount of the crosslinked monomers is preferably 0.02% to 5% by weight, especially 0.05% to 2% by weight, based on the graft base E.2.

In the case of cyclic crosslinking monomers having at least 3 ethylenically unsaturated groups, it is advantageous to restrict the amount to less than 1% by weight of the graft base E.2.

Preferred "other" polymerizable, ethylenically unsaturated monomers which, in addition to the acrylic esters, may optionally be used to produce the graft base E.2 are acrylonitrile, styrene, α-methylstyrene, acrylamides, vinyl $C_1$-$C_6$-alkyl ethers, methyl methacrylate, glycidyl methacrylate, butadiene. Preferred acrylate rubbers as graft base E.2 are emulsion polymers having a gel content of at least 60% by weight.

In addition to elastomer modifiers based on graft polymers, it is likewise possible to use elastomer modifiers which are not based on graft polymers and which have glass transition temperatures of <10° C., preferably <0° C., more preferably <−20° C. These preferably include elastomers having a block copolymer structure and additionally thermoplastically meltable elastomers, especially EPM, EPDM and/or SEBS rubbers (EPM=ethylene-propylene copolymer, EPDM=ethylene-propylene-diene rubber and SEBS=styrene-ethene-butene-styrene copolymer).

Lubricants and/or demolding agents for use as component E) are preferably long-chain fatty acids, especially stearic acid or behenic acid, salts thereof, especially calcium stearate or zinc stearate, and the ester derivatives thereof, especially those based on pentaerythritol, especially fatty acid esters of pentaerythritol or amide derivatives, especially ethylenebisstearylamide, montan waxes and low molecular weight polyethylene or polypropylene waxes.

Montan waxes in the context of the present invention are mixtures of straight-chain saturated carboxylic acids having chain lengths of 28 to 32 carbon atoms.

According to the invention, particular preference is given to using lubricants and/or demolding agents from the group of esters of saturated or unsaturated aliphatic carboxylic acids having 8 to 40 carbon atoms with aliphatic saturated alcohols or amides of amines having 2 to 40 carbon atoms with unsaturated aliphatic carboxylic acids having 8 to 40 carbon atoms or instead of the respective carboxylic acids metal salts of saturated or unsaturated aliphatic carboxylic acids having 8 to 40 carbon atoms.

Lubricants and/or demolding agents for use with very particular preference as component E) may be selected from the group of pentaerythritol tetrastearate [CAS No. 115-83-3], ethylenebisstearylamide, calcium stearate and ethylene glycol dimontanate. The use of calcium stearate [CAS No. 1592-23-0] or ethylenebisstearylamide [CAS No. 110-30-5] is especially preferred. The use of ethylenebisstearylamide (Loxiol® EBS from Emery Oleochemicals) is very especially preferred.

Hydrolysis stabilizers/components for reducing water absorption for use with preference as component E) are preferably polyesters, preference being given to polybutylene terephthalate and/or polyethylene terephthalate and very particular preference to polyethylene terephthalate. The polyesters are used preferably in concentrations of 5% to 20% by weight and more preferably in concentrations of 7% to 15% by weight, based in each case on the overall polymer composition and with the proviso that the sum total of all percentages by weight of the polymer composition is always 100% by weight.

In the case of a laser-absorbent component/laser-absorbent high-voltage component, it is possible to use, as component E), at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone. Tin oxide, antimony trioxide or antimony tin oxide are particularly preferred. Antimony trioxide is very particularly preferred.

The laser absorber, especially the antimony trioxide, may be used directly as a powder or in the form of masterbatches. Preferred masterbatches are those based on polyamide and/or polyolefins, preferably polyethylene. It is very particularly preferable to use antimony trioxide in the form of a nylon-6-based masterbatch.

The laser absorber may be used individually or as a mixture of two or more laser absorbers.

Laser absorbers can absorb laser light of a particular wavelength. In practice, this wavelength is in the range from 157 nm to 10.6 µm. Examples of lasers of these wavelengths are described in WO2009/003976 A1. Preference is given to using Nd:YAG lasers, which can achieve wavelengths of 1064, 532, 355 and 266 nm, and $CO_2$ lasers.

Laser-transparent high-voltage components Preference is given in accordance with the invention to high-voltage components, especially high-voltage components for electromobility, based on polymer compositions comprising
  A) per 100 parts by mass of at least one polyamide, preferably nylon-6 or nylon-6,6, especially nylon-6,
  B) 0.01 to 5 parts by mass of 10,10′-oxybis-12H-phthaloperin-12-one and
  C) 1 to 150 parts by mass of at least one filler and reinforcer to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers,
with the proviso of a color distance ΔE<20 from the L*a*b* coordinates of a color number beginning with "2" in the RAL color chart and a laser transparency at a wavelength of 980 nm of at least 10%.

Preference is given in accordance with the invention to high-voltage components, especially high-voltage components for electromobility, based on polymer compositions comprising A) per 100 parts by mass of at least one polyamide, preferably nylon-6 or nylon-6,6, especially nylon-6,
B) 0.01 to 5 parts by mass of 10,10'-oxybis-12H-phthaloperin-12-one,
C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
D) 3 to 100 parts by mass of at least one flame retardant additive, preferably to be selected from mineral flame retardants, nitrogen-containing flame retardants or phosphorus-containing flame retardants, with the proviso of a color distance $\Delta E<20$ from the $L^*a^*b^*$ coordinates of a color number beginning with "2" in the RAL color chart and a laser transparency at a wavelength of 980 nm of at least 10%.

Preference is given in accordance with the invention to high-voltage components, especially high-voltage components for electromobility, based on polymer compositions comprising A) per 100 parts by mass of at least one polyamide, preferably nylon-6 or nylon-6,6, especially nylon-6,
B) 0.01 to 5 parts by mass of 10,10'-oxybis-12H-phthaloperin-12-one,
C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
E) 0.01 to 2 parts by mass of at least one thermal stabilizer, preferably to be selected from the group of sterically hindered phenols, especially those containing at least one 2,6-di-tert-butylphenyl group and/or 2-tert-butyl-6-methylphenyl group, and also phosphites, hypophosphites, especially sodium hypophosphite $NaH_2PO_2$, hydroquinones, aromatic secondary amines and 3,3'-thiodipropionates, with the proviso of a color distance $\Delta E<20$ from the $L^*a^*b^*$ coordinates of a color number beginning with "2" in the RAL color chart and a laser transparency at a wavelength of 980 nm of at least 10%.

Preference is given in accordance with the invention to high-voltage components, especially high-voltage components for electromobility, based on polymer compositions comprising A) per 100 parts by mass of at least one polyamide, preferably nylon-6 or nylon-6,6, especially nylon-6,
B) 0.01 to 5 parts by mass of 10,10'-oxybis-12H-phthaloperin-12-one,
C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers,
D) 3 to 100 parts by mass of at least one flame retardant additive, preferably to be selected from mineral flame retardants, nitrogen-containing flame retardants or phosphorus-containing flame retardants, and
E) 0.01 to 2 parts by mass of at least one thermal stabilizer, preferably to be selected from the group of sterically hindered phenols, especially those containing at least one 2,6-di-tert-butylphenyl group and/or 2-tert-butyl-6-methylphenyl group, and also phosphites, hypophosphites, especially sodium hypophosphite $NaH_2PO_2$, hydroquinones, aromatic secondary amines and 3,3'-thiodipropionates, with the proviso of a color distance $\Delta E<20$ from the $L^*a^*b^*$ coordinates of a color number beginning with "2" in the RAL color chart and a laser transparency at a wavelength of 980 nm of at least 10%.

Particular preference is given in accordance with the invention to high-voltage components, especially high-voltage components for electromobility, with the proviso of a color distance $\Delta E<20$ from the $L^*a^*b^*$ coordinates of a color number beginning with "2" in the RAL color chart and a laser transparency/laser transmittance at a wavelength of 980 nm of at least 20%, more preferably in the range from 25% to 90%. For measurement of laser transparency, see above and especially K. D. Feddersen "Laserdurchstrahlschweißen—die Lösung für nicht lösbare Verbindungen", Österreichische Kunststoffzeitschrift 1/2 2018, pages 50-52.

Laser-Absorbent High-Voltage Components

Preference is given in accordance with the invention to high-voltage components, especially high-voltage components for electromobility, based on polymer compositions containing A) per 100 parts by mass of at least one polyamide, preferably nylon-6 or nylon-6,6, especially nylon-6,
B) 0.01 to 5 parts by mass of 10,10'-oxybis-12H-phthaloperin-12-one and
E) at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone, with the proviso of a color distance $\Delta E<20$ from the $L^*a^*b^*$ coordinates of a color number beginning with "2" in the RAL color chart. Particularly preferred laser absorbers are tin oxide, antimony trioxide or antimony tin oxide. Antimony trioxide is very particularly preferred.

Preference is given in accordance with the invention to high-voltage components, especially high-voltage components for electromobility, based on polymer compositions containing A) per 100 parts by mass of at least one polyamide, preferably nylon-6 or nylon-6,6, especially nylon-6,
B) 0.01 to 5 parts by mass of 10,10'-oxybis-12H-phthaloperin-12-one,
C) 1 to 150 parts by mass of at least one filler and reinforcer to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and E) at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone, with the proviso of a color distance $\Delta E<20$ from the $L^*a^*b^*$ coordinates of a color number beginning with "2" in the RAL color chart.

Preference is given in accordance with the invention to high-voltage components, especially high-voltage components for electromobility, based on polymer compositions containing A) per 100 parts by mass of at least one polyamide, preferably nylon-6 or nylon-6,6, especially nylon-6, B) 0.01 to 5 parts by mass of 10,10'-oxybis-12H-phthaloperin-12-one, C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and D) 3 to 100 parts by mass of at least one flame retardant additive, preferably to be selected from mineral flame retardants, nitrogen-containing flame retardants or phosphorus-containing flame retardants, and E) at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone, with the proviso of a color distance $\Delta E<20$ from the $L^*a^*b^*$ coordinates of a color number beginning with "2" in the RAL color chart.

Process

The present invention additionally relates to a process for producing the polymer compositions to be used in the high-voltage components, especially in high-voltage components for electromobility, having a color distance $\Delta E<20$ from the $L^*a^*b^*$ coordinates of a color number beginning with "2" in the RAL color chart, preferably a $\Delta E<10$, more preferably $\Delta E<5$, and a laser transparency at a wavelength of 980 nm of at least 10%, by mixing A) at least one polyamide and B) 10,10'-oxybis-12H-phthaloperin-12-one, and also optionally at least one of the further components C), D) or E), with one another in at least one mixing tool, where E) does not represent a laser absorber, especially not a laser absorber according to the above-defined component E).

In the process according to the invention, preference is given to using 0.01 to 5 parts by mass of 10,10'-oxybis-12H-phthaloperin-12-one per 100 parts by mass of at least one polyamide. The high-voltage components according to the process of the invention preferably have a laser transparency at a wavelength of 980 nm of at least 20%, more preferably in the range from 25% to 90%.

The present invention additionally relates to a process for producing high-voltage components, especially high-voltage components for electromobility, having a color distance $\Delta E<20$ from the $L^*a^*b^*$ coordinates of a color number beginning with "2" in the RAL color chart, preferably a $\Delta E<10$, more preferably $\Delta E<5$ a laser transparency at a wavelength of 980 nm of at least 10%, by subjecting the polymer compositions to further processing by injection molding, including the special methods of GIT (gas injection technology), WIT (water injection technology) and PIT (projectile injection technology), by extrusion methods, including profile extrusion, or by blow molding. Before further processing, the polymer compositions are optionally discharged to give strands, cooled until pelletizable, optionally dried and pelletized. In one embodiment, the polymer composition is stored intermediately in pelletized form. In this case, no laser absorber is used, especially no laser absorber according to the above-defined component E). Preference is given to achieving a laser transparency of at least 33%, more preferably in the range from 40% to 90%.

Corresponding processes are also applicable to the production of high-voltage components, wherein 0.01 to 3 parts by mass of 10,10'-oxybis-12H-phthaloperin-12-one are used per 100 parts by mass of at least one polyamide and a color distance $\Delta E<20$ from the $L^*a^*b^*$ coordinates of a color number beginning with "2" in the RAL color chart, preferably a $\Delta E<10$, more preferably $\Delta E<5$, and a laser transparency of at least 10% is achieved by using no laser absorber as component E). Preference is given to achieving a laser transparency at a wavelength of 980 nm of at least 20%, more preferably in the range from 25% to 90%.

More particularly, the invention relates to a process for producing high-voltage components, especially high-voltage components for electromobility, having a color distance $\Delta E<20$ from the $L^*a^*b^*$ coordinates of a color number beginning with "2" in the RAL color chart, preferably a $\Delta E<10$, more preferably $\Delta E<5$, and a laser transparency at a wavelength of 980 nm of at least 10%, by mixing A) at least one polyamide and B) 10,10'-oxybis-12H-phthaloperin-12-one, preferably 0.01 to 5 parts by mass of 10,10'-oxybis-12H-phthaloperin-12-one per 100 parts by mass of at least one polyamide, with one another to give polymer compositions, extruding to give strands, cooling until pelletizable, drying and pelletizing, and then subjecting the polymer compositions to further processing by injection molding, including the special methods of GIT (gas injection technology), WIT (water injection technology) and PIT (projectile injection technology), by extrusion methods, including profile extrusion, or by blow molding, wherein no laser absorber is used as component E), especially no laser absorber according to the above-defined component E).

By way of clarification, it should be noted that the scope of the present invention encompasses all definitions and parameters listed in general in the context of the compositions or high-voltage components or specified in areas of preference in any combinations of the processes of the invention.

Irrespective of the process variant, the laser welding process is highly dependent on the material properties of the two joining partners. The degree of laser transparency (LT) of the part through which the laser passes directly influences the process speed by virtue of the amount of energy that can be introduced per unit time. Semicrystalline thermoplastics generally have lower laser transparency by virtue of their inherent microstructure, usually in the form of spherulites. These scatter the incident laser light more significantly than the internal structure of a purely amorphous thermoplastic: backscatter leads to a reduced amount of total energy in transmission; diffuse (lateral) scatter often leads to broadening of the laser beam and hence loss of welding precision. A semicrystalline morphology is generally a hindrance to high laser transparency, but offers advantages in other properties. For instance, semicrystalline materials are mechanically durable even above the glass transition temperature and generally have better chemical resistance than amorphous materials. Rapidly crystallizing materials additionally offer advantages in processing, especially rapid demoldability and hence short cycle times. What is therefore desirable is the combination of semicrystallinity, rapid crystallization and high laser transparency. The selection of further components C) fillers or reinforcers, D) flame-retardant additive and E) thermal stabilizer, and any further additives, has to be made with the proviso that, firstly, the products, high-voltage components and high-voltage components for electromobility that are to be produced in accordance with the invention have a color distance ΔE<20 from the L*a*b* coordinates of a color number beginning with "2" in the RAL color chart, and also a laser transparency of at least 10%.

Preference is given in accordance with the invention to a process for producing high-voltage components, especially high-voltage components for electromobility, having a color distance ΔE<20 from the L*a*b* coordinates of a color number beginning with "2" in the RAL color chart, preferably a ΔE<10, more preferably ΔE<5, and a laser transparency at a wavelength of 980 nm of at least 10%, by mixing A) at least one polyamide and B) 10,10'-oxybis-12H-phthaloperin-12-one with one another to give polymer compositions, extruding to give strands, cooling until pelletizable, drying and pelletizing, and then subjecting the polymer compositions to further processing by injection molding, including the special methods of GIT (gas injection technology), WIT (water injection technology) and PIT (projectile injection technology), by extrusion methods, including profile extrusion, or by blow molding, wherein
  A) per 100 parts by mass of at least one polyamide, preferably nylon-6 or nylon-6,6, especially nylon-6,
  B) 0.01 to 5 parts by mass of 10,10'-oxybis-12H-phthaloperin-12-one and
  C) 1 to 150 parts by mass of at least one filler and reinforcer to be selected from the group of glass beads or solid or hollow glass beads, or glass fibers, or milled glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or milled quartz, mica, phlogopite, barium sulfate, feldspar, wollastonite, montmorillonite, pseudoboehmite of formula AlO(OH), magnesium carbonate and talc, especially glass fibers, are used, without using a laser absorber as component E).

Preference is given to achieving a laser transparency of at least 20%, more preferably in the range from 25% to 90%.

Preference is given in accordance with the invention to a process for producing high-voltage components, especially high-voltage components for electromobility, having a color distance ΔE<20 from the L*a*b* coordinates of a color number beginning with "2" in the RAL color chart, preferably a ΔE<10, more preferably ΔE<5, and a laser transparency at a wavelength of 980 nm of at least 10%, by mixing
  A) per 100 parts by mass of at least one polyamide, preferably nylon-6 or nylon-6,6, especially nylon-6,
  B) 0.01 to 5 parts by mass of 10,10'-oxybis-12H-phthaloperin-12-one,
  C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
  D) 3 to 100 parts by mass of at least one flame retardant additive, preferably to be selected from mineral flame retardants, nitrogen-containing flame retardants or phosphorus-containing flame retardants,
with one another to give polymer compositions, extruding to strands, cooling until pelletizable, drying and pelletizing, and then subjecting the polymer compositions to further processing by injection molding, including the special methods of GIT (gas injection technology), WIT (water injection technology) and PIT (projectile injection technology), by extrusion methods, including profile extrusion, or by blow molding, without using a laser absorber as component E).

Preference is given in accordance with the invention to a process for producing laser-transparent high-voltage components, especially high-voltage components for electromobility, having a color distance ΔE<20 from the L*a*b* coordinates of a color number beginning with "2" in the RAL color chart, preferably a ΔE<10, more preferably ΔE<5, and a laser transparency at a wavelength of 980 nm of at least 10%, by mixing
  A) per 100 parts by mass of at least one polyamide, preferably nylon-6 or nylon-6,6, especially nylon-6,
  B) 0.01 to 5 parts by mass of 10,10'-oxybis-12H-phthaloperin-12-one,
  C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
  E) 0.01 to 2 parts by mass of at least one thermal stabilizer, preferably to be selected from the group of sterically hindered phenols, especially those containing at least one 2,6-di-tert-butylphenyl group and/or 2-tert-butyl-6-methylphenyl group, and also phosphites, hypophosphites, especially sodium hypophosphite $NaH_2PO_2$, hydroquinones, aromatic secondary amines and 3,3'-thiodipropionates,
with one another to give polymer compositions, extruding to strands, cooling until pelletizable, drying and pelletizing, and then subjecting the polymer compositions to further processing by injection molding, including the special methods of GIT (gas injection technology), WIT (water injection technology) and PIT (projectile injection technology), by extrusion methods, including profile extrusion, or by blow molding, without using a laser absorber as component E).

Preference is given in accordance with the invention to a process for producing laser-transparent high-voltage components, especially high-voltage components for electromobility, having a color distance ΔE<20 from the L*a*b* coordinates of a color number beginning with "2" in the RAL color chart, preferably a ΔE<10, more preferably ΔE<5, and a laser transparency at a wavelength of 980 nm of at least 10%, by mixing A) per 100 parts by mass of at least one polyamide, preferably nylon-6 or nylon-6,6, especially nylon-6,
B) 0.01 to 5 parts by mass of 10,10'-oxybis-12H-phthaloperin-12-one,
C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers,
D) 3 to 100 parts by mass of at least one flame retardant additive, preferably to be selected from mineral flame retardants, nitrogen-containing flame retardants or phosphorus-containing flame retardants, and
E) 0.01 to 2 parts by mass of at least one thermal stabilizer, preferably to be selected from the group of sterically hindered phenols, especially those containing at least one 2,6-di-tert-butylphenyl group and/or 2-tert-butyl-6-methylphenyl group, and also phosphites, hypophosphites, especially sodium hypophosphite $NaH_2PO_2$, hydroquinones, aromatic secondary amines and 3,3'-thiodipropionates, with one another to give polymer compositions, extruding to strands, cooling until pelletizable, drying and pelletizing, and then subjecting the polymer compositions to further processing by injection molding, including the special methods of GIT (gas injection technology), WIT (water injection technology) and PIT (projectile injection technology), by extrusion methods, including profile extrusion, or by blow molding, without using a laser absorber as component E).

The high-voltage components or high-voltage components for electromobility preferably have a laser transparency at a wavelength of 980 nm of at least 20%, especially in the range from 25% to 90%, and therefore no laser absorber is used, especially no laser absorber according to the above-defined component E).

By way of clarification, it should be noted that the scope of the present invention encompasses all definitions and parameters listed in general in the context of the polymer compositions or high-voltage components or specified in areas of preference in any combinations of the processes of the invention.

High-Voltage Components

The present invention additionally relates to high-voltage components, especially high-voltage components for electromobility, having a color distance ΔE<20 from the L*a*b* coordinates of a color number beginning with "2" in the RAL color chart, preferably a ΔE<10, more preferably ΔE<5, and a laser transparency of at least 10%, obtainable by means of the above-described polymer compositions by further processing via injection molding, including the special methods of GIT (gas injection technology), WIT (water injection technology) and PIT (projectile injection technology), by extrusion methods, including profile extrusion, or by blow molding are processed further, without using a laser absorber, especially a laser absorber according to the above-defined component E). In the case of the high-voltage components, laser transparency is measured at 980 nm on a shaped body of thickness 2 mm. It is preferably at least 20%.

The polyamide-based high-voltage components, especially the high-voltage components for electromobility, preferably have a laser transparency at a wavelength of 980 nm of at least 20%, more preferably in the range from 25% to 90%. The polyamide used is preferably nylon-6 or nylon-6,6.

In the case that non-laser-transparent high-voltage components, especially high-voltage components for electromobility, are desired, component E) used is at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone. Tin oxide, antimony trioxide or antimony tin oxide are particularly preferred. Antimony trioxide is very particularly preferred.

Alternatively, in the context of the present invention, it is possible to use titanium dioxide, carbon black, $SiO_2$, metal compounds, especially copper hydroxide phosphate or copper phosphate, as laser absorbers in the laser-absorbent high-voltage components, in the compositions of the invention and in the processes and uses of the invention. See: DE-A 198 14 298, DE 10 2004 051 246 A1. The laser absorber for use as additive E) is preferably used in an amount of 0.01 to 80 parts by mass, more preferably in an amount of 0.05 to 50 parts by mass, most preferably in an amount of 0.1 to 30 parts by mass, based in each case on 100 parts by mass of component A).

By way of clarification, it should be noted that the scope of the present invention encompasses all definitions and parameters listed in general in the context of the polymer compositions or specified in the areas of preference in any combinations of the inventive high-voltage components or high-voltage components for electromobility.

Preferred high-voltage components, especially high-voltage components for electromobility, but also laser-transparent and laser-transmitting high-voltage components find use in electrical drivetrains and/or in battery systems. Particularly preferred high-voltage components are covers for electrics or electronics, control devices, covers/housings for fuses, relays, battery cell modules, fuse holders, fuse plugs, terminals, cable holders or sheathings, especially sheathings of high-voltage bus bars and high-voltage distributor bus bars.

Uses

The present invention also relates to the use of 10,10'-oxybis-12H-phthaloperin-12-one for the production of polyamide-based products, with the proviso of a color distance ΔE<20 from the L*a*b* coordinates of a color number beginning with "2" in the RAL color chart, preferably a ΔE<10, more preferably a ΔE<5, and a laser transparency of at least 10%; see the above details under the heading "Orange" that are applicable to the uses claimed here. Laser transparency is measured on the injection-molded product at a wavelength of 980 nm on a shaped body of thickness 2 mm. The latter is preferably at least 20%, more preferably in the range from 25% to 90%.

The present invention preferably relates to the use of 10,10'-oxybis-12H-phthaloperin-12-one for the production of polyamide-based high-voltage components, with the proviso of a color distance ΔE<20 from the L*a*b* coordinates of a color number beginning with "2" in the RAL color chart, preferably a ΔE<10, more preferably a ΔE<5, and a laser transparency at a wavelength of 980 nm of at least 10%.

The present invention more preferably relates to the use of 10,10'-oxybis-12H-phthaloperin-12-one for the production of polyamide-based high-voltage components for electromobility, with the proviso of a color distance ΔE<20 from the L*a*b* coordinates of a color number beginning with "2" in the RAL color chart, preferably a ΔE<10, more preferably ΔE<5, and a laser transparency at a wavelength of 980 nm of at least 10%.

In the case of use of 10,10'-oxybis-12H-phthaloperin-12-one for the production of non-laser-transparent or laser-absorbent polymer compositions or high-voltage components, especially high-voltage components for electromobility, component E) used is at least one laser absorber selected from the group of antimony trioxide, tin oxide, tin orthophosphate, barium titanate, aluminum oxide, copper hydroxyphosphate, copper orthophosphate, potassium copper diphosphate, copper hydroxide, antimony tin oxide, bismuth trioxide and anthraquinone. Tin oxide, antimony trioxide or antimony tin oxide are particularly preferred. Antimony trioxide is very particularly preferred.

Alternatively, in the context of the present invention, it is possible to use titanium dioxide, carbon black, $SiO_2$, metal compounds, especially copper hydroxide phosphate or copper phosphate, as laser absorbers in the laser-absorbent high-voltage components. See: DE-A 198 14 298, DE 10 2004 051 246 A1. The laser absorber for use as additive E) is preferably used in an amount of 0.01 to 80 parts by mass, more preferably in an amount of 0.05 to 50 parts by mass, most preferably in an amount of 0.1 to 30 parts by mass, based in each case on 100 parts by mass of component A).

At present, there still is no standard forming a basis on which a measurement of laser transparency has to be carried out. Laser transmittance is therefore determined in the context of the present invention at a wavelength of 1064 nm by means of a thermoelectric measurement of power. The measurement geometry can be described as follows: a reference beam is divided at an angle of 90° with a power of 1 watt from a laser beam (diode-pumped Nd-YAG laser having a wavelength of 1064 nm, FOBA DP50) having a total power of 2 watts by means of a beam divider (SQ2 non-polarizing beam divider from Laser-optik GmbH). This hits the reference sensor. The part of the original beam that passes through the beam divider constitutes the measurement beam, likewise with a power of 1 watt. This is focused by a mode shutter (5.0) beyond the beam divider to a focus having diameter 0.18 mm. The laser transparency (LT) measurement sensor is positioned at a distance of 80 mm beneath the focus. The test plaque is positioned at a distance of 2 mm above the LT measurement sensor. Preferably in accordance with the invention, the test plaques are injection-molded test plaques with dimensions of 60·60·2 mm³, with edge gating. The measurement is made in the middle of the plaque (intersection of the two diagonals). The total measurement time is 30 s, with the measurement result being ascertained in the last 5 s. The signals from reference sensor and measurement sensor are detected simultaneously. The start of the measurement is simultaneous with the insertion of the sample. Transmittance and hence laser transparency (LT) are found from the following formula:

$$LT = signal_{measurement\ sensor}/signal_{reference\ sensor} \times 100\%$$

This mode of measurement rules out fluctuations in the laser system and subjective reading errors. For each plaque, the LT average is formed from at least five measurements. The formation of the average is conducted on 10 plaques for each material. The averages of the individual plaque measurements are ultimately used to calculate the mean and standard deviation for the material to be examined.

Irrespective of the process variant, the laser welding process is highly dependent on the material properties of the two joining partners. The degree of laser transparency (LT) of the part through which the laser passes directly influences the process speed by virtue of the amount of energy that can be introduced per unit time. Semicrystalline thermoplastics generally have lower laser transparency by virtue of their inherent microstructure, usually in the form of spherulites. These scatter the incident laser light more significantly than the internal structure of a purely amorphous thermoplastic: backscatter leads to a reduced amount of total energy in transmission; diffuse (lateral) scatter often leads to broadening of the laser beam and hence loss of welding precision. A semicrystalline morphology is generally a hindrance to high laser transparency, but offers advantages in other properties. For instance, semicrystalline materials are mechanically durable even above the glass temperature and generally have better chemical resistance than amorphous materials. Rapidly crystallizing materials additionally offer advantages in processing, especially rapid demoldability and hence short cycle times. What is therefore desirable is the combination of semicrystallinity, rapid crystallization and high laser transparency. The selection of further components C) fillers or reinforcers, D) flame-retardant additive and E) thermal stabilizer, and any further additives, has to be made with the proviso that, firstly, the products, high-voltage components and high-voltage components for electromobility that are to be produced from the polymer compositions have a color distance ΔE<20 from the L*a*b* coordinates of a color number beginning with "2" in the RAL color chart, and also a laser transparency of at least 10%.

Preference is given in accordance with the invention to the use of 10,10'-oxybis-12H-phthaloperin-12-one for the production of laser-transparent polyamide-based products, wherein
A) per 100 parts by mass of at least one polyamide, preferably nylon-6 or nylon-6,6, especially nylon-6,
B) 0.01 to 5 parts by mass of 10,10'-oxybis-12H-phthaloperin-12-one and
C) 1 to 150 parts by mass of at least one filler and reinforcer to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, are used, with the proviso of a color distance ΔE<20 from the L*a*b* coordinates of a color number beginning with "2" in the RAL color chart, preferably a ΔE<10, more preferably ΔE<5, and a laser transparency at a wavelength of 980 nm of at least 10%, wherein no laser absorber is used, especially no laser absorber according to the above-defined component E). Preference is given to achieving a laser transparency of at least 20%, more preferably in the range from 25% to 90%.

Preference is given in accordance with the invention to the use of 10,10'-oxybis-12H-phthaloperin-12-one for the production of laser-transparent polyamide-based products, wherein
- A) per 100 parts by mass of at least one polyamide, preferably nylon-6 or nylon-6,6, especially nylon-6,
- B) 0.01 to 5 parts by mass of 10,10'-oxybis-12H-phthaloperin-12-one,
- C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
- D) 3 to 100 parts by mass of at least one flame retardant additive, preferably to be selected from mineral flame retardants, nitrogen-containing flame retardants or phosphorus-containing flame retardants, are used, with the proviso of a color distance ΔE<20 from the L*a*b* coordinates of a color number beginning with "2" in the RAL color chart, preferably a ΔE<10, more preferably ΔE<5, and a laser transparency of at least 10%, wherein no laser absorber is used, especially no laser absorber according to the above-defined component E). Preference is given to achieving a laser transparency at a wavelength of 980 nm of at least 20%, more preferably in the range from 25% to 90%.

Preference is given in accordance with the invention to the use of 10,10'-oxybis-12H-phthaloperin-12-one for the production of laser-transparent polyamide-based products, wherein
- A) per 100 parts by mass of at least one polyamide, preferably nylon-6 or nylon-6,6, especially nylon-6,
- B) 0.01 to 5 parts by mass of 10,10'-oxybis-12H-phthaloperin-12-one,
- C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers, and
- E) 0.01 to 2 parts by mass of at least one heat stabilizer, preferably to be selected from the group of sterically hindered phenols, especially those containing at least one 2,6-di-tert-butylphenyl group and/or 2-tert-butyl-6-methylphenyl group, and also phosphites, hypophosphites, especially sodium hypophosphite $NaH_2PO_2$, hydroquinones, aromatic secondary amines and 3,3'-thiodipropionates, are used, with the proviso of a color distance ΔE<20 from the L*a*b* coordinates of a color number beginning with "2" in the RAL color chart, preferably a ΔE<10, more preferably ΔE<5, and a laser transparency at a wavelength of 980 nm of at least 10%, wherein no laser absorber is used, especially no laser absorber according to the above-defined component E).

Preference is given in accordance with the invention to the use of 10,10'-oxybis-12H-phthaloperin-12-one for the production of laser-transparent polyamide-based products, wherein
- A) per 100 parts by mass of at least one polyamide, preferably nylon-6 or nylon-6,6, especially nylon-6,
- B) 0.01 to 5 parts by mass of 10,10'-oxybis-12H-phthaloperin-12-one,
- C) 1 to 150 parts by mass of at least one filler and reinforcer, preferably to be selected from the group of glass beads or solid or hollow glass beads, or glass fibers, or ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc, especially glass fibers,
- D) 3 to 100 parts by mass of at least one flame retardant additive, preferably to be selected from mineral flame retardants, nitrogen-containing flame retardants or phosphorus-containing flame retardants, and
- E) 0.01 to 2 parts by mass of at least one heat stabilizer, preferably to be selected from the group of sterically hindered phenols, especially those containing at least one 2,6-di-tert-butylphenyl group and/or 2-tert-butyl-6-methylphenyl group, and also phosphites, hypophosphites, especially sodium hypophosphite $NaH_2PO_2$, hydroquinones, aromatic secondary amines and 3,3'-thiodipropionates, are used, with the proviso of a color distance ΔE<20 from the L*a*b* coordinates of a color number beginning with "2" in the RAL color chart, preferably a ΔE<10, more preferably ΔE<5, and a laser transparency at a wavelength of 980 nm of at least 10%, wherein no laser absorber is used, especially no laser absorber according to the above-defined component E).

Preference is given to achieving a laser transparency at a wavelength of 980 nm of at least 20%, more preferably in the range from 25% to 90%.

Preference is given to using 10,10'-oxybis-12H-phthaloperin-12-one for marking of polyamide-based products as high-voltage components, especially high-voltage components for electromobility.

By way of clarification, it should be noted that the scope of the present invention encompasses all definitions and parameters listed in general in the context of the polymer compositions or high-voltage components or specified in areas of preference in any combinations of the uses of the invention.

EXAMPLES

To demonstrate the improvements in properties described in accordance with the invention, corresponding polyamide-based polymer compositions were first made up by compounding. For this purpose, the individual components were mixed in a twin-screw extruder (ZSK 25 Compounder from Coperion Werner & Pfleiderer (Stuttgart, Germany)) at temperatures between 270 and 300° C., discharged as a strand, cooled until pelletizable and pelletized. After drying (generally for two days at 80° C. in a vacuum drying cabinet), the pellets were processed by injection molding at temperatures in the range from 270 to 290° C. to give standard test specimens for the respective tests.

In the context of the present tests, a measure of bleeding was considered to be the discoloration of a 30·20·2 mm³ plasticized PVC film (P-PVC, FB110 white, standard low temperature resistance from Jedi Kunststofftechnik GmbH, Eitorf, Germany) which was stored in a hot air drying cabinet at 80° C. for 12 hours clamped between two 60·40·2 mm³ plastic sheets based on the compositions shown in Table 2. This was followed by visual evaluation according to the gray scale of ISO 105-A02, with '5' meaning that the PVC film showed no color change and '1' meaning that the PVC film showed a significant color change.

In the context of the present invention, a measure of lightfastness was considered to be the discoloration of the molding compounds described in Table 2 in the form of 60·40·2 mm³ sheets after storage under UV with UV light (Suntest CPS+, 300-800 nm, 45-130 klx, with window glass filter 250-765 W/m² from Atlas Material Testing Technology GmbH, Linsengericht, Germany) for 96 h. Discoloration was evaluated visually based on the blue wool scale according to DIN EN ISO 105-B02, with '8' representing exceptional lightfastness (little color change) and '1' representing very low lightfastness (significant color change).

Reactants:
Component A) nylon-6 (Durethan® B26, from Lanxess Deutschland GmbH, Cologne, Germany)
Component B): 10,10'-oxy-bis-12H-phthaloperin-12-one [CAS No. 203576-97-0] from Angene International Limited, London
Component X/1): 12H-Phthaloperin-12-one [CAS No. 6925-69-5] in the form of Macrolex® Orange 3G from Lanxess Deutschland GmbH, Cologne

TABLE II

| | | Ex. 1 | Comp. 1 |
|---|---|---|---|
| Component A) | Pts. by wt. | 100 | 100 |
| Component B) | Pts. by wt. | 0.3 | |
| Component X/1 | Pts. by wt. | | 0.3 |
| Bleeding | Gray scale | 5 | 4 |
| Lightfastness | Blue wool scale | 7 | 6 |
| Laser transparency | [%] | 27 | n.d. |

The results in Tab. II show that inventive example 1 showed laser transparency with simultaneously lower bleeding than the material colored with component X/1 according to the prior art in comp. 1, and additionally had higher lightfastness as well. The plastic plaques examined in inventive example 1 had an RAL color value of 2001 with a ΔE of <10. n.d. stands for "not determined" at the filing date of the present invention.

Laser transparency of the specimens analyzed in the context of the present application was measured in the near infrared (NIR) at a laser wavelength of 980 nm in accordance with DVS-Richtlinie 2243 (01/2014) "Laserstrahlschweißen thermoplastischer Kunststoffe" using plaques having dimensions of 60 mm·60 mm·2 mm with the LPKF TMG3 transmittance analyzer from LPKF Laser & Electronics AG, Garbsen, Germany, calibrated beforehand with an analytical standard generated according to DIN EN ISO/IEC 17025; see: LPKF AG 101016-DE: "Einfache Transmissionsmessung für Kunststoffe LPKF TMG3".

What is claimed is:
1. An electromobility assembly comprising:
a voltage-conducting part having an operating voltage according to class B of ISO6469-3:2018; and
a high-voltage component in direct contact with or directly adjacent to the voltage-conducting part, wherein the high-voltage component comprises a polymer composition comprised of the following components:
(A) at least one polyamide, and
(B) a 10,10'-oxybis-12H-phthaloperin-12-one dye, wherein
the 10,10'-oxybis-12H-phthaloperin-12-one dye component (B) is present in an amount of 0.01 to 5 parts by mass per 100 parts by mass of the at least one polyamide component (A) which is sufficient to achieve (i) an orange color corresponding to a color distance ΔE<20 from the L*a*b* coordinates of a color number beginning with "2" in the RAL color chart, and (ii) reduced contact bleeding of the 10,10'-oxybis-12H-phthaloperin-12-one component (B) as compared to a high-voltage component having 12H-phthaloperin-12-one as component (B).

2. The electromobility assembly according to claim 1, wherein the polymer composition comprises 0.01 to 3 parts by mass of the 10,10'-oxybis-12H-phthaloperin-12 component (B) per 100 parts by mass of the at least one polyamide component (A).

3. The electromobility assembly according to claim 2, wherein the polymer composition further comprises the following component:
(C) at least one filler and/or reinforcer per 100 parts by mass of the at least one polyamide (A).

4. The electromobility assembly according to claim 3, wherein the polymer composition further comprises the component:
(D) at least one flame retardant.

5. The electromobility assembly according to claim 4, wherein the polymer composition further comprises the component:
(E) at least one further additive other than the components (B), (C) and (D).

6. The electromobility assembly according to claim 3, wherein the filler and/or reinforcer component (C) is selected from the group consisting of solid glass beads, hollow glass beads, glass fibers, ground glass, amorphous quartz glass, aluminum borosilicate glass having an alkali content of 1% (E glass), amorphous silica, quartz flour, calcium silicate, calcium metasilicate, magnesium carbonate, kaolin, calcined kaolin, chalk, kyanite, powdered or ground quartz, mica, phlogopite, barium sulfate, feldspar, wollastonite, montmorillonite, pseudoboehmite of the formula AlO(OH), magnesium carbonate and talc.

7. The electromobility assembly according to claim 4, wherein the at least one flame retardant component (D) is selected from mineral flame retardants, nitrogen-containing flame retardants and phosphorus-containing flame retardants.

8. The electromobility assembly according to claim 5, wherein the at least one additive component (E) is at least on heat stabilizer.

9. The electromobility assembly according to claim 5, wherein the polymer composition comprises, based on 100 parts by mass of the at least one polyamide (A):
(B) 0.01 to 5 parts by mass of the 10,10'-oxybix-12H-phthaloperin-12-one,
(C) 1 to 150 parts by mass of the at least one filler and reinforcer, and (E) 0.01 to 2 parts by mass of the at least one heat stabilizer.

10. The electromobility assembly according to claim 5, wherein the polymer composition comprises, based on 100 parts by mass of the at least one polyamide (A):
(B) 0.01 to 5 parts by mass of the 10,10'-oxybix-12H-phthaloperin-12-one,
(C) 1 to 150 parts by mass of the at least one filler and reinforcer,
(D) 3 to 100 parts by mass of the at least one flame retardant additive, and
(E) 0.01 to 2 parts by mass of the at least one heat stabilizer.

11. The electromobility assembly according to claim 1, wherein the high-voltage component is a component selected from the group consisting of covers for electrics or electronics, control devices, covers/housings for fuses, relays, battery cell modules, fuse holders, fuse plugs, terminals, cable holders, and sheathings.

12. The electromobility assembly according to claim 2, wherein in addition to the components (A) and (B), the polymer composition further comprises the component:
(C) 1 to 150 parts by mass of at least one filler and/or reinforcer, based on 100 parts by mass of the at least one polyamide component (A).

13. The electromobility assembly according to claim 3, wherein the polymer composition further comprises the component:
(D) 3 to 100 parts by mass of at least one flame retardant based on 100 parts by mass of the component A).

14. The electromobility assembly according to claim 4, wherein the polymer composition further comprises the component:
(E) 0.01 to 80 parts by mass of at least one further additive other than the components (B), (C) and (D), based on 100 parts by mass of component (A).

15. The electromobility assembly according to claim 1, wherein the high-voltage component is a touch guard, a warning marking or a shield component.

16. The electromobility assembly according to claim 1, wherein the polymer composition further comprises the component:
(D) at least one flame retardant.

17. The electromobility assembly according to claim 11, wherein the high-voltage component is a sheathing of high-voltage bus bars and/or a sheathing of high-voltage distributor bus bars.

18. The electromobility assembly according to claim 2, wherein the polymer composition further comprises:
(D) 3 to 100 parts by mass of at least one flame retardant based on 100 parts by mass of the component A).

19. The electromobility assembly according to claim 2, wherein the polymer composition further comprises:
(E) 0.01 to 80 parts by mass of at least one further additive other than the components (B), (C) and (D), based on 100 parts by mass of component (A).

* * * * *